United States Patent
Kanai et al.

(10) Patent No.: US 9,804,025 B2
(45) Date of Patent: Oct. 31, 2017

(54) SPECTROMETRY DEVICE AND IMAGE FORMING APPARATUS

(71) Applicant: Seiko Epson Corporation, Tokyo (JP)

(72) Inventors: Masashi Kanai, Azumino (JP); Naoki Kuwata, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/061,208

(22) Filed: Mar. 4, 2016

(65) Prior Publication Data
US 2016/0263910 A1 Sep. 15, 2016

(30) Foreign Application Priority Data

Mar. 12, 2015 (JP) .................. 2015-049939

(51) Int. Cl.
| G01J 3/28 | (2006.01) |
| G01J 3/02 | (2006.01) |
| G01J 3/50 | (2006.01) |
| G01J 3/06 | (2006.01) |
| G01J 3/26 | (2006.01) |

(52) U.S. Cl.
CPC ............ *G01J 3/0208* (2013.01); *G01J 3/021* (2013.01); *G01J 3/027* (2013.01); *G01J 3/0237* (2013.01); *G01J 3/0262* (2013.01); *G01J 3/0278* (2013.01); *G01J 3/06* (2013.01); *G01J 3/26* (2013.01); *G01J 3/50* (2013.01); *G01J 2003/064* (2013.01)

(58) Field of Classification Search
CPC ........ G01J 3/28; G01J 3/02; G01J 3/06; G01J 3/33; G01J 3/10
See application file for complete search history.

(56) References Cited

U.S. PATENT DOCUMENTS

2006/0164657 A1* 7/2006 Chalmers ........... G01B 11/0625
356/630
2007/0070351 A1 3/2007 Nou et al.

FOREIGN PATENT DOCUMENTS

| JP | 61-017046 A | 1/1986 |
| JP | 2001-264173 A | 9/2001 |
| JP | 2007-085963 A | 4/2007 |
| JP | 2010-210456 A | 9/2010 |

* cited by examiner

*Primary Examiner* — Abdullahi Nur
(74) *Attorney, Agent, or Firm* — Harness, Dickey & Pierce, P.L.C.

(57) ABSTRACT

A printer incorporating a spectrometry device includes a spectroscope that includes a light receiving optical system including a light receiver which receives reflected light from a range of measurement in a medium, a distance sensor that detects the distance between the medium and the spectroscope, and a reflecting mirror driver and an optical path adjuster that adjust the optical path of the reflected light which is incident on the light receiving optical system from the range of measurement according to the distance detected by the distance sensor.

18 Claims, 18 Drawing Sheets

SPECTROMETRY DEVICE AND IMAGE FORMING APPARATUS

BACKGROUND

1. Technical Field

The present invention relates to a spectrometry device and to an image forming apparatus and the like.

2. Related Art

In the related art, there is known, in an image forming apparatus such as a color printer, a device that measures the color of a color image (color patch or the like) formed by the image forming apparatus and provides feedback of a color measurement result to the image forming apparatus in order to form the color image desired by a user with high accuracy.

In such an image forming apparatus, a color image is formed on a medium such as paper and is irradiated with light from a light source, and light reflected by the color image is incident on a colorimeter to perform a colorimetry process. At this time, the colorimeter is mounted on a printer head that forms an image on the medium, and scanning with the printer head can measure the color of the color image on the medium with a simple configuration. However, driving error of the printer head, distortion of a medium transport path, strain on the paper medium, and the like change the distance between the medium and the colorimeter, and the position of measurement performed by the colorimeter may be shifted from the original position at which the color is to be measured.

Regarding this matter, there is known a device that corrects the color measurement result according to the distance between the medium and the colorimeter (for example, refer to JP-A-2010-210456).

The device disclosed in JP-A-2010-210456 irradiates the medium with light by using a light source in which the central portion is bright while the peripheral portion is dark and receives reflected light with a light receiver that is divided into a plurality of light receiving regions. Then, a distance signal corresponding to the distance between the medium and the colorimeter is calculated on the basis of a light reception signal of each light receiving element, and the amount of light received is corrected.

The device of the related art disclosed in JP-A-2010-210456 calculates the distance signal on the basis of the light reception signal from each light receiving element. As such, if the distance signal is calculated on the basis of the light reception signal, correction accuracy (color measurement accuracy) decreases because measurement noise affects the light reception signal, in which case a problem arises in that a spectrometry process (colorimetry process) cannot be performed with sufficient accuracy.

SUMMARY

An advantage of some aspects of the invention is to provide a spectrometry device and an image forming apparatus capable of performing a high accuracy spectrometry process.

According to an application example of the invention, there is provided a spectrometry device including a spectroscope that includes a light receiving optical system including a light receiver and on which light from a measurement target is incident, a distance detector that detects the distance between the measurement target and the spectroscope, and a first optical path adjusting unit that adjusts the optical path of the light incident on the light receiving optical system from the measurement target according to the distance detected by the distance detector.

In the application example, the first optical path adjusting unit adjusts the optical path of the light incident on the light receiving optical system from the measurement target according to the distance between the measurement target and the spectroscope detected by the distance detector.

Accordingly, even if the distance between the measurement target and the spectroscope is changed, the optical path can be adjusted so that light at a predetermined position of measurement in the measurement target is incident on the light receiver according to the distance. Therefore, a spectrometry process (colorimetry process) can be appropriately performed by the spectroscope at the position of measurement, and measurement error can be reduced.

As described above, correction accuracy is dependent on noise in a configuration of the related art that, for example, performs distance correction against a change in the distance between the spectroscope and the measurement target on the basis of a light reception signal from the light receiver. Meanwhile, in the application example, distance correction is performed by physically adjusting the optical path of the light incident on the light receiving optical system. Thus, influence from noise can be suppressed, correction accuracy can be improved, and a high accuracy spectrometry process can be performed.

In the spectrometry device of the application example, it is preferable that the spectroscope includes an illumination optical system that irradiates the measurement target with illumination light, and the first optical path adjusting unit adjusts the optical path of the light incident on the light receiving optical system so that light that is reflected toward the light receiving optical system from a region in the measurement target irradiated with the illumination light is incident on the light receiver.

In the application example, the optical path of the light incident on the light receiving optical system is adjusted so that the light reflected in a range of irradiation with the illumination light is received by the light receiver. In such a configuration, even if the position of measurement is shifted by a change in the distance between the measurement target and the spectroscope, light from the position of measurement is received by the light receiver. Thus, measurement error accompanied by a distance change can be reduced, and high accuracy spectrometry can be performed.

In the spectrometry device of the application example, it is preferable that the light receiving optical system includes a first reflecting mirror that reflects the light incident on the light receiving optical system toward the light receiver, and the first optical path adjusting unit changes the angle of the first reflecting mirror.

In the application example, the first optical path adjusting unit changes the angle of the first reflecting mirror incorporated into the light receiving optical system so that the light from a predetermined position in the measurement target is received by the light receiver. In such a configuration, the optical path of incident light in the light receiving optical system can be easily changed by a simple configuration.

That is, if an optical element such as a light receiving element or a spectroscopy element to which a signal line is connected is used as an optical element for changing the optical path, a configuration is complicated because a drive mechanism that prevents a break in the signal line is required. Meanwhile, such a signal line is not required to be connected to the first reflecting mirror, and thus, it is not necessary to take into consideration a break or the like in the signal line. Therefore, the attitude of the first reflecting mirror can be changed by a simple configuration, and a configuration in the light receiving optical system is simplified.

If the attitude of the light receiver is changed or the light receiver is moved, other optical members are required to be subsequently moved. Meanwhile, in the application example, the optical path of the light incident on the light receiver can be changed by changing only the attitude of the first reflecting mirror, and optical path adjustment is facilitated. If an element, for example, a wavelength-selective interference filter (etalon element), of which the spectral wavelength is changed by vibration is used as a spectroscopy element, it is necessary to wait until the vibration becomes stationary when the attitude change or movement of the spectroscopy element is performed. Meanwhile, when the angle of the first reflecting mirror is changed, there is no influence from the vibration, and high speed spectrometry can be performed.

In the spectrometry device of the application example, it is preferable that the light receiving optical system includes a first reflecting mirror that reflects the light incident on the light receiving optical system toward the light receiver, and the first optical path adjusting unit moves the first reflecting mirror in a predetermined direction.

In the application example, the first optical path adjusting unit moves the first reflecting mirror incorporated into the light receiving optical system so that the light from a predetermined position in the measurement target is received by the light receiver.

In this case, the first reflecting mirror that does not require a signal line connection is moved as in the above application example. Thus, the position of the first reflecting mirror can be easily controlled by a simple configuration. In addition, no attitude change or movement of other optical members such as the spectroscopy element is required, and optical path adjustment is facilitated. Furthermore, it is not necessary to wait for wavelength stabilization in the spectroscopy element, and high speed measurement can be performed.

In addition, even if the distance between the position of measurement in the measurement target and the spectroscope is changed, the light receiver can receive light that is emitted (reflected) at the same angle from the position of measurement. Therefore, the angle of the reflected light at the position of measurement can be maintained at, for example, an angle based on the geometrical condition defined in the color measurement standard (JIS Z 8722), and appropriate spectrometry complying with the color measurement standard can be performed.

In the spectrometry device of the application example, the first optical path adjusting unit may move the light receiver.

In the application example, the first optical path adjusting unit moves the light receiver so that the light from a predetermined position of measurement in the measurement target is received by the light receiver. In this case, as in the above application example, even if the distance between the spectroscope and the measurement target is changed, light from the position of measurement is received by the light receiver. Thus, high accuracy spectrometry can be performed.

In the application example, it is preferable that the first optical path adjusting unit parallelly moves the light receiver.

In the application example, the first optical path adjusting unit parallelly moves the light receiver. Thus, even if the distance between the position of measurement in the measurement target and the spectroscope is changed, the light receiver can receive light that is emitted (reflected) at the same angle from the position of measurement. Therefore, the angle of the reflected light at the position of measurement can be maintained at, for example, an angle based on the geometrical condition defined in the color measurement standard (JIS Z 8722), and appropriate spectrometry complying with the color measurement standard can be performed.

In the spectrometry device of the application example, the light receiving optical system may include an aperture that passes part of light from the measurement target, and the first optical path adjusting unit may pivot the light receiver around the aperture.

In the application example, a configuration of the spectroscope can be simplified particularly when light from the measurement target is directly incident on the light receiver (when the first reflecting mirror is not disposed), and by pivoting the light receiver around the aperture, the optical path of the light incident on the light receiving optical system can be adjusted so that the light reflected at the position of measurement in the measurement target is incident on the light receiver.

In the spectrometry device of the application example, it is preferable that the light receiving optical system includes a spectroscopy element on which the light incident on the light receiving optical system is incident, and the first optical path adjusting unit moves the spectroscopy element.

The spectroscopy element is moved in the same direction as the light receiver if the light receiver is parallelly moved. The spectroscopy element is moved (pivoted) in the same direction of pivoting as the light receiver if the light receiver is pivoted.

As described above, an element such as a wavelength-selective interference filter (etalon element) that has a restricted range in which light is passed and has a spectral wavelength changed by the angle of incidence may be used as the spectroscopy element. In the application example, moving the spectroscopy element simultaneously with the light receiver does not change the position or angle of the spectroscopy element with respect to the optical axis of the light incident on the light receiver. Thus, even if such a spectroscopy element is used, the problem that spectroscopy is not performed on the incident light or the problem that the wavelength of light on which spectroscopy is performed is not a desired wavelength can be avoided, and a decrease in the accuracy of spectrometry can be suppressed.

In the spectrometry device of the application example, the first optical path adjusting unit may rotate the light receiver.

In the application example, the first optical path adjusting unit causes light from the position of measurement to be incident on the light receiver by rotating the light receiver. In this case, as in the above application example, even if the distance between the spectroscope and the measurement target is changed, light from the position of measurement is received by the light receiver. Thus, high accuracy spectrometry can be performed. A space for movement is required if the light receiver is moved, and thus, the light receiver may be only rotated in the application example. Thus, the size of the spectroscope is reduced.

In the spectrometry device of the application example, it is preferable that the light receiving optical system includes a spectroscopy element on which the light from the measurement target is incident, and the first optical path adjusting unit pivots the spectroscopy element.

In the application example, even if an element such as a wavelength-selective interference filter that has a restricted range in which light is passed or has a spectral wavelength changed by the angle of incidence is used as the spectroscopy element as in the above application example, the problem that spectroscopy is not performed on the incident light or the problem that the wavelength of light on which spectroscopy is performed is not a desired wavelength can be avoided, and a decrease in the accuracy of spectrometry can be suppressed.

According to another application example of the invention, there is provided a spectrometry device including a spectroscope that includes an illumination optical system including a light source and irradiating a measurement target with illumination light and a light receiving optical system including a light receiver and on which light reflected by the measurement target is incident, a distance detector that detects the distance between the measurement target and the spectroscope, and a second optical path adjusting unit that adjusts the optical path of light emitted from the light source according to the distance detected by the distance detector.

In the application example, the second optical path adjusting unit adjusts the optical path of the light emitted from the light source according to the distance between the measurement target and the spectroscope detected by the distance detector.

Accordingly, even if the distance between the measurement target and the spectroscope is changed, the optical path of the light emitted from the light source can be adjusted so that the illumination light is incident at a predetermined position of measurement in the measurement target according to the distance. Therefore, a spectrometry process (colorimetry process) can be appropriately performed by the spectroscope at the position of measurement, and measurement error can be reduced.

In addition, since distance correction is performed by physically adjusting the optical path of the light incident on the illumination optical system, influence from noise can be suppressed in comparison with a configuration of the related art that, for example, performs distance correction against a change in the distance between the spectroscope and the measurement target on the basis of a light reception signal from the light receiver. Thus, correction measurement can be improved, and a high accuracy spectrometry process can be performed.

In the spectrometry device of the application example, it is preferable that the second optical path adjusting unit adjusts the optical path of the light emitted from the light source so that light that is reflected toward the light receiving optical system from a region in the measurement target irradiated with the illumination light is incident on the light receiver.

In the application example, the optical path of the light emitted from the light source is adjusted so that the light reflected in a range of irradiation with the illumination light is incident on the light receiver. In such a configuration, even if the distance between the measurement target and the spectroscope is changed, the range of measurement is set in the region irradiated with the illumination light, and light that is reflected in the range of measurement can be received by the light receiver. Thus, measurement error accompanied by a distance change can be reduced, and high accuracy spectrometry can be performed.

In the application example, it is preferable that the illumination optical system includes a second reflecting mirror that reflects the light from the light source toward the measurement target, and the second optical path adjusting unit changes the angle of the second reflecting mirror.

In the application example, the second optical path adjusting unit changes the angle of the second reflecting mirror incorporated into the illumination optical system so that the position of measurement in the measurement target is irradiated with the illumination light. In such a configuration, the optical path of light of the light source in the illumination optical system can be easily changed by a simple configuration.

That is, if the attitude of, for example, a light source to which a signal line is connected is changed or the light source is moved for changing the optical path, a configuration is complicated because a drive mechanism that prevents a break in the signal line is required. Meanwhile, such a signal line is not required to be connected to the second reflecting mirror, and thus, it is not necessary to take into consideration a break or the like in the signal line. Therefore, the attitude of the second reflecting mirror can be changed by a simple configuration, and a configuration in the illumination optical system is simplified.

In the spectrometry device of the application example, it is preferable that the illumination optical system includes a second reflecting mirror that reflects the light from the light source toward the measurement target, and the second optical path adjusting unit moves the second reflecting mirror.

In the application example, the second optical path adjusting unit moves the second reflecting mirror incorporated into the illumination optical system so that the position of measurement in the measurement target is irradiated with the illumination light.

In this case, the second reflecting mirror that does not require a signal line connection is moved as in the above application example. Thus, a configuration is simplified.

In addition, even if the position of measurement approaches to or separates from the spectroscope by a change in the distance between the spectroscope and the measurement target, the position of measurement can be irradiated with the illumination light at the same angle. Therefore, the angle of the illumination light at the position of measurement can be maintained at, for example, an angle based on the geometrical condition defined in the color measurement standard (JIS Z 8722), and appropriate spectrometry complying with the color measurement standard can be performed.

In the application example, the second optical path adjusting unit may move the light source.

In the application example, the second optical path adjusting unit matches the principal ray of the illumination light and the position of the measurement by moving the light source. In this case, as in the above application example, even if the distance between the spectroscope and the measurement target is changed, the position of measurement can be irradiated with the illumination light so that the central portion of the illumination light matches the position of the measurement. Thus, an illuminance decrease at the position of measurement can be suppressed, and high accuracy spectrometry can be performed.

In the application example, it is preferable that the second optical path adjusting unit parallelly moves the light source.

In the application example, the second optical path adjusting unit parallelly moves the light source. Thus, even if the position of measurement approaches to or separates from the spectroscope by a change in the distance between the spectroscope and the measurement target, the position of measurement can be irradiated with the illumination light at the same angle. Therefore, the angle of the illumination light at the position of measurement can be maintained at, for example, an angle based on the geometrical condition defined in the color measurement standard (JIS Z 8722), and appropriate spectrometry complying with the color measurement standard can be performed.

In the spectrometry device of the application example, the illumination optical system may include an illumination-side aperture that passes part of the light emitted from the light source, and the second optical path adjusting unit may pivot the light source around the illumination-side aperture.

In the application example, a configuration of the spectroscope can be simplified particularly when the measurement target is directly irradiated with the light of the light source (when the second reflecting mirror is not disposed), and the principal ray of the illumination light and the position of measurement can be easily matched by pivoting the light source around the illumination-side aperture.

In the spectrometry device of the application example, the second optical path adjusting unit may rotate the light source.

In the application example, the second optical path adjusting unit matches the principal ray of the illumination light and the position of the measurement by rotating the light source. In this case, as in the above application example, even if the distance between the spectroscope and the measurement target is changed, the principal ray of the illumination light and the position of measurement can be matched. Thus, high accuracy spectrometry can be performed. A space for movement is required if the light source is moved, and thus, the light source may be only rotated in the application example. Thus, the size of the illumination optical system is reduced.

According to still another application example of the invention, there is provided a spectrometry device including a spectroscope that includes an illumination optical system including a light source and irradiating a measurement target with illumination light and a light receiving optical system including a light receiver and on which light reflected by the measurement target is incident, a distance detector that detects the distance between the measurement target and the spectroscope, and a moving unit that moves the spectroscope in a direction connecting the spectroscope and the measurement target with respect to the measurement target according to the distance detected by the distance detector.

In the application example, the moving unit controls the position of the spectroscope with respect to the measurement target according to the distance between the measurement target and the spectroscope detected by the distance detector so that the position of measurement in the measurement target is irradiated with the illumination light from the illumination optical system and that light reflected at the position of measurement is received by the light receiver. That is, the moving unit maintains the distance between the measurement target and the spectroscope at a distance in which appropriate spectrometry can be performed.

Thus, even if distortion of a transport path of the measurement target, strain on the measurement target, and the like occur, the distance between the measurement target and the spectroscope is constantly maintained according to the distortion, strain, and the like. Thus, measurement error due to an illuminance decrease at the position of measurement can be reduced.

In addition, approaching or separation of the spectroscope is physically performed as in the above application example. Thus, correction accuracy can be improved without influence from noise, and a high accuracy spectrometry process can be performed.

According to still another application example of the invention, there is provided a spectrometry device including a spectroscope that includes an illumination optical system including a light source and irradiating a measurement target with illumination light and a light receiving optical system including a light receiver and on which light reflected by the measurement target is incident, in which the light receiver includes a light receiving region of a size in which light reflected from a predetermined range of measurement in the measurement target can be received when the distance between the measurement target and the spectroscope is in a predetermined allowable distance.

In the application example, the light that is reflected from a predetermined range of measurement in the measurement target is incident in the light receiving region of the light receiver if the size of the light receiving region of the light receiver and the distance between the measurement target and the spectroscope are in the allowable range. Therefore, high accuracy stabilized spectrometry can be performed independently of the distance between the measurement target and the spectroscope.

According to still another application example of the invention, there is provided an image forming apparatus including the spectrometry device and an image forming unit that forms an image on an image formation target.

In the application example, a reference color image such as a color patch is formed by the image forming unit on the image formation target, and then, high accuracy spectrometry can be performed by the spectrometry device on the reference color image formed. Thus, it is possible to determine with high accuracy whether the color of the reference color image formed is the same as the color that the image forming unit is commanded to form, and, if the colors are different, feedback can be provided to the image forming unit according to a spectrometry result.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
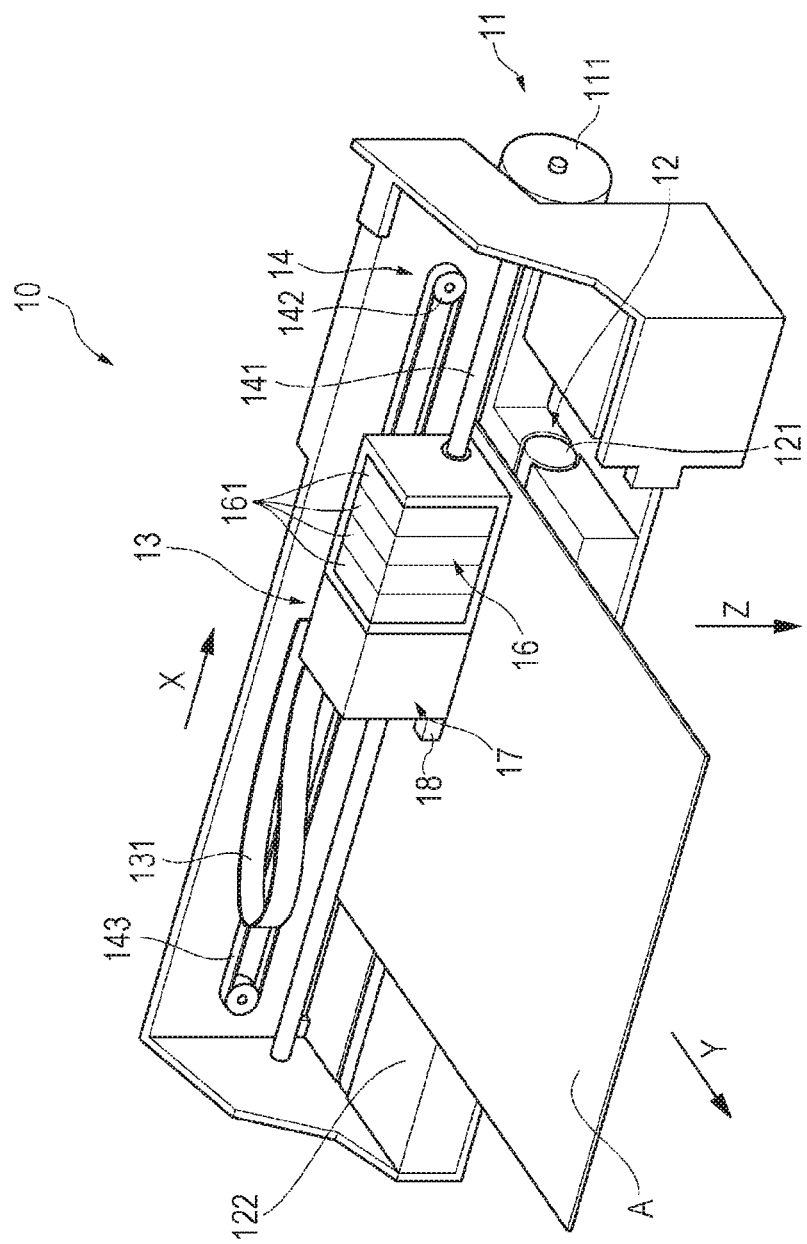
FIG. 1 is a perspective view illustrating an exterior configuration of a printer of a first embodiment according to the invention.
Figure 2:
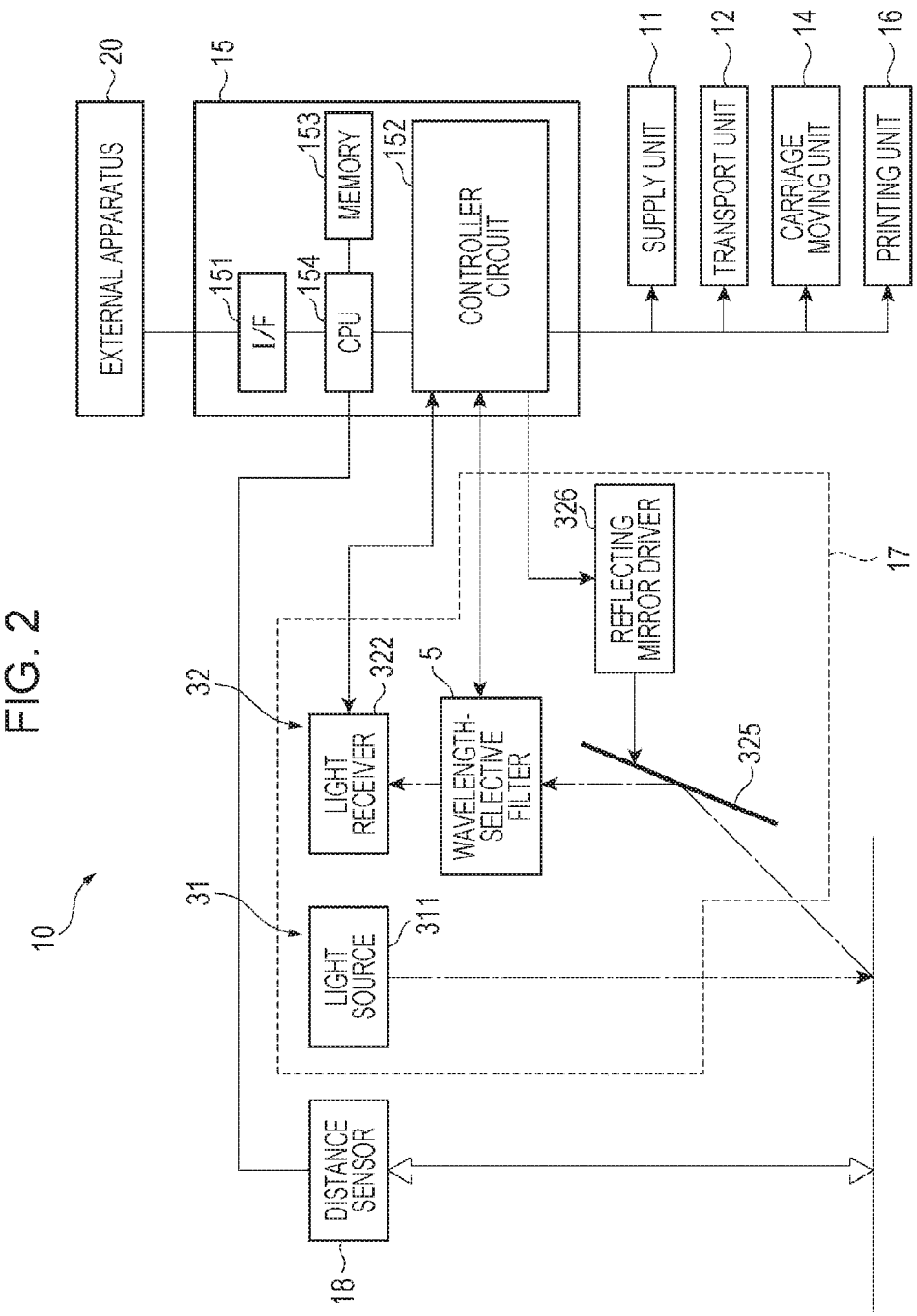
FIG. 2 is a block diagram illustrating a schematic configuration of the printer of the first embodiment.

Hereinafter, a first embodiment according to the invention will be described on the basis of the drawings. In the present embodiment, hereinafter, a printer 10 (ink jet printer) that includes a spectrometry device will be described as an example of an image forming apparatus of the invention.
Schematic Configuration of Printer FIG. 1 is a diagram illustrating an exterior configuration example of the printer 10 of the first embodiment. FIG. 2 is a block diagram illustrating a schematic configuration of the printer 10 of the present embodiment.

As illustrated in FIG. 1, the printer 10 includes a supply unit 11, a transport unit 12, a carriage 13, a carriage moving unit 14, and a control unit 15 (refer to FIG. 2). The printer 10 controls each of the units 11, 12, 14, and the carriage 13 on the basis of print data that is input from an external apparatus 20 such as a personal computer and prints an image on a medium A (constitutes a measurement target and an image formation target of the invention). In addition, the printer 10 of the present embodiment forms a measurement color patch at a predetermined position on the medium A on the basis of preset calibration print data and performs spectrometry on the color patch. Accordingly, the printer 10 determines whether a color shift is present in the printed color by comparing an actual measured value from the color patch with the calibration print data and, if a color shift is present, corrects color on the basis of the actual measured value.

Hereinafter, each configuration of the printer 10 will be specifically described.

The supply unit 11 is a unit that supplies the image formation target medium A (illustrated as paper in the present embodiment) to the position of image formation. The supply unit 11, for example, includes a roll body 111 (refer to FIG. 1) on which the medium A is wound, a roll drive motor (not illustrated), and a roll drive wheel array (not illustrated). The roll drive motor is rotationally driven on the basis of a command from the control unit 15, and the torque of the roll drive motor is transmitted to the roll body 111 through the roll drive wheel array. Accordingly, the roll body 111 rotates and supplies the paper wound on the roll body 111 to the downstream side (+Y direction) in a Y direction (sub-scanning direction).

While the present embodiment illustrates supply of paper that is wound on the roll body 111, this illustration is not for limitation purposes. The medium A may be supplied in any method such as supplying the medium A such as paper stacked in a tray or the like, for example, one sheet at a time by a roller or the like.

The transport unit 12 transports the medium A supplied from the supply unit 11 along the Y direction. The transport unit 12 is configured to include a transport roller 121, a driven roller (not illustrated) that is arranged to interpose the medium A between the transport roller 121 and the driven roller and driven by the transport roller 121, and a platen 122.

Drive force is transmitted to the transport roller 121 from a transport motor, not illustrated. When the transport motor is driven by control of the control unit 15, the transport roller 121 is rotationally driven by the torque of the transport motor and transports along the Y direction the medium A that is interposed between the transport roller 121 and the driven roller. The platen 122 that faces the carriage 13 is disposed on the downstream side (+Y side) of the transport roller 121 in the Y direction.

The carriage 13 includes a printing unit 16 that prints an image on the medium A, a spectroscope 17 that performs spectrometry at a predetermined position of measurement (in a range of measurement) on the medium A, and a distance sensor 18 that measures the distance between the medium A and the spectroscope 17.

The carriage 13 is disposed to be movable by the carriage moving unit 14 along a main-scanning direction (X direction) that intersects with the Y direction.

The carriage 13 is connected to the control unit 15 by a flexible circuit 131 and performs a printing process (process of forming an image on the medium A) with the printing unit 16 and a light intensity measuring process with the spectroscope 17 on the basis of a command from the control unit 15.

A detailed configuration of the carriage 13 will be described later.

The carriage moving unit 14 constitutes a moving unit of the invention and causes the carriage 13 to reciprocate along the X direction on the basis of a command from the control unit 15.

The carriage moving unit 14, for example, is configured to include a carriage guide shaft 141, a carriage motor 142, and a timing belt 143.

The carriage guide shaft 141 is arranged along the X direction and has both end portions fixed to, for example, the casing of the printer 10. The carriage motor 142 drives the timing belt 143. The timing belt 143 is supported approximately parallel to the carriage guide shaft 141, and a part of the carriage 13 is fixed thereto. When the carriage motor 142 is driven on the basis of a command of the control unit 15, the timing belt 143 travels in normal and reverse directions, and the carriage 13 fixed to the timing belt 143 reciprocates while being guided by the carriage guide shaft 141.

Next, a configuration of the printing unit 16, the spectroscope 17, and the distance sensor 18 disposed in the carriage 13 will be described.
Configuration of Printing Unit (Image Forming Unit)

The printing unit 16 is an image forming unit of the invention and forms an image on the medium A by discharging ink separately onto the medium A from the part facing the medium A.

Ink cartridges 161 that correspond to ink of a plurality of colors are mounted on the printing unit 16 in an attachable and detachable manner, and ink is supplied from each ink cartridge 161 to an ink tank (not illustrated) through a tube (not illustrated). In addition, nozzles (not illustrated) that discharge ink drops are disposed on the lower face of the printing unit 16 (at a position facing the medium A) in correspondence with each color. A piezoelectric element, for example, is arranged in each of these nozzles. Driving the piezoelectric element causes an ink drop supplied from the ink tank to be discharged and hit the medium A, and a dot is formed.

Configuration of Spectroscope

Figure 3:
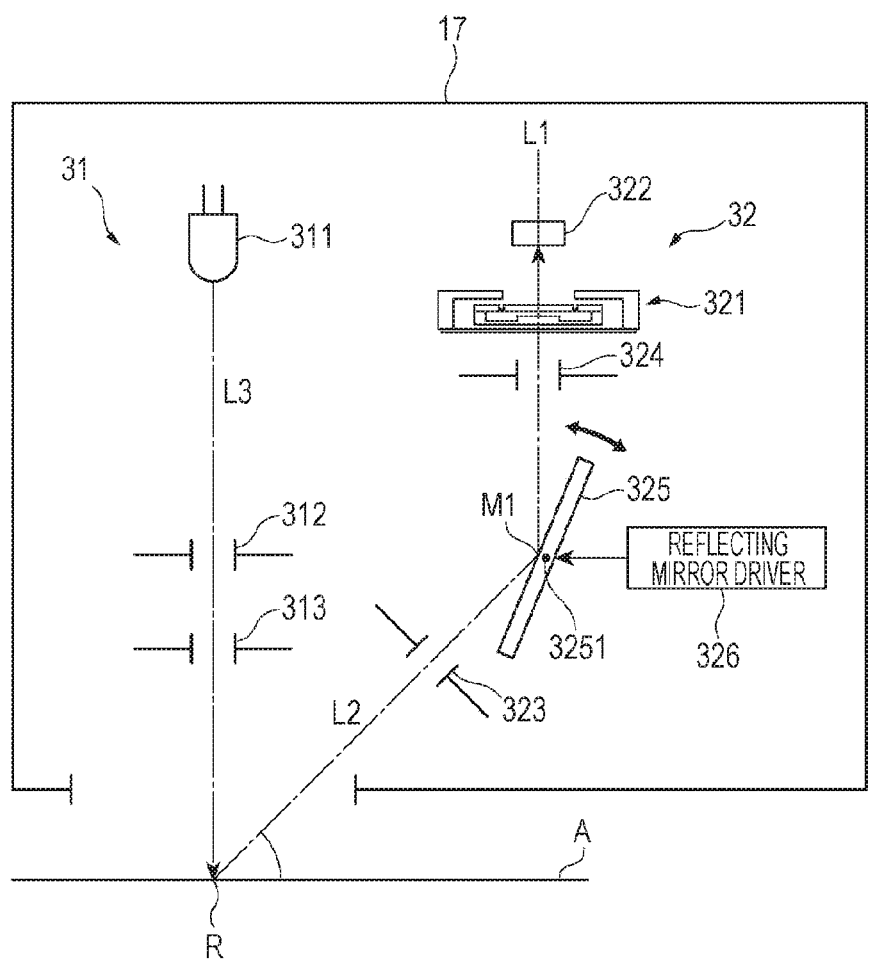
FIG. 3 is a schematic diagram illustrating a configuration of a spectroscope of the first embodiment.

FIG. 3 is a schematic diagram illustrating a configuration of the spectroscope 17.

The spectroscope 17 includes an illumination optical system 31 and a light receiving optical system 32 as illustrated in FIG. 3.

The spectroscope 17 irradiates the medium A with illumination light from the illumination optical system 31 and receives reflective light reflected by the medium A with the light receiving optical system 32. A spectroscopy device 321 that is disposed in the light receiving optical system 32 can select a transmitted wavelength on the basis of control of the control unit 15 and can perform spectrometry at the position of measurement on the medium A by measuring the intensity of light of each wavelength in visible light.

In the present embodiment, spectrometry is performed in accordance with (0°:45° x) geometrical optics condition defined by the color measurement standard (JIS Z 8722). That is, in the present embodiment, illumination light from the illumination optical system 31 is incident on the medium A in the direction of the normal line of the medium A (at an angle of incidence of 10° or less), and light reflected by the medium A at 45°±2° is received by the light receiving optical system 32.

While the present embodiment illustrates the illumination optical system 31 and the light receiving optical system 32 as being linearly configured along the X direction for convenience of description, this illustration is not for limitation purposes. The illumination optical system 31 and the light receiving optical system 32 may be linearly configured along the Y direction, or the illumination optical system 31 and the light receiving optical system 32 may be linearly configured along the direction intersecting with the X and Y directions.

Configuration of Illumination Optical System

The illumination optical system 31 includes a light source 311, an illumination-side first aperture 312, and an illumination-side second aperture 313 as illustrated in FIG. 3.

In the illumination optical system 31, the medium A is irradiated with light (illumination light), of the light emitted from the light source 311, that passes through the illumination-side first aperture 312 and the illumination-side second aperture 313. Such illumination light, generally, has a high intensity (high luminance) in the central portion thereof and has a low intensity in the peripheral portion thereof. The illumination light turns into a spotlight by passing through the apertures 312 and 313, and the central point (on the principal ray) of the spot light that the medium A is irradiated with is a central measurement point R. In the present embodiment, a range of measurement that is smaller than or equal to the diametral dimension of the spot light around the central measurement point R is set as the position of measurement and a target of spectrometry.

As the light source 311, it is preferable to use a light source that can emit light of each wavelength in the visible light region. For example, such a light source can be exemplified by a halogen lamp, a xenon lamp, or a white LED.

As the illumination optical system 31, various optical components such as a collimator lens and a condenser lens may be further arranged therein.

Configuration of Light Receiving Optical System

The light receiving optical system 32 includes the spectroscopy device 321, a light receiver 322, a light-reception-side first aperture 323, a light-reception-side second aperture 324, a reflecting mirror 325, and a reflecting mirror driver 326 as illustrated in FIG. 3.

In the light receiving optical system 32, light that passes through the light-reception-side first aperture 323 after being reflected by the medium A is reflected by the reflecting mirror 325 and is caused to pass through the light-reception-side second aperture 324. The light that passes through the light-reception-side second aperture 324 is incident on the spectroscopy device 321. Then, light of a predetermined wavelength is emitted after spectroscopy is performed, and the emitted light is received by the light receiver 322. As the light receiving optical system 32, a configuration in which disposed is a bandpass filter that cuts light other than visible light may be used.

Configuration of Spectroscopy Device

Figure 4:
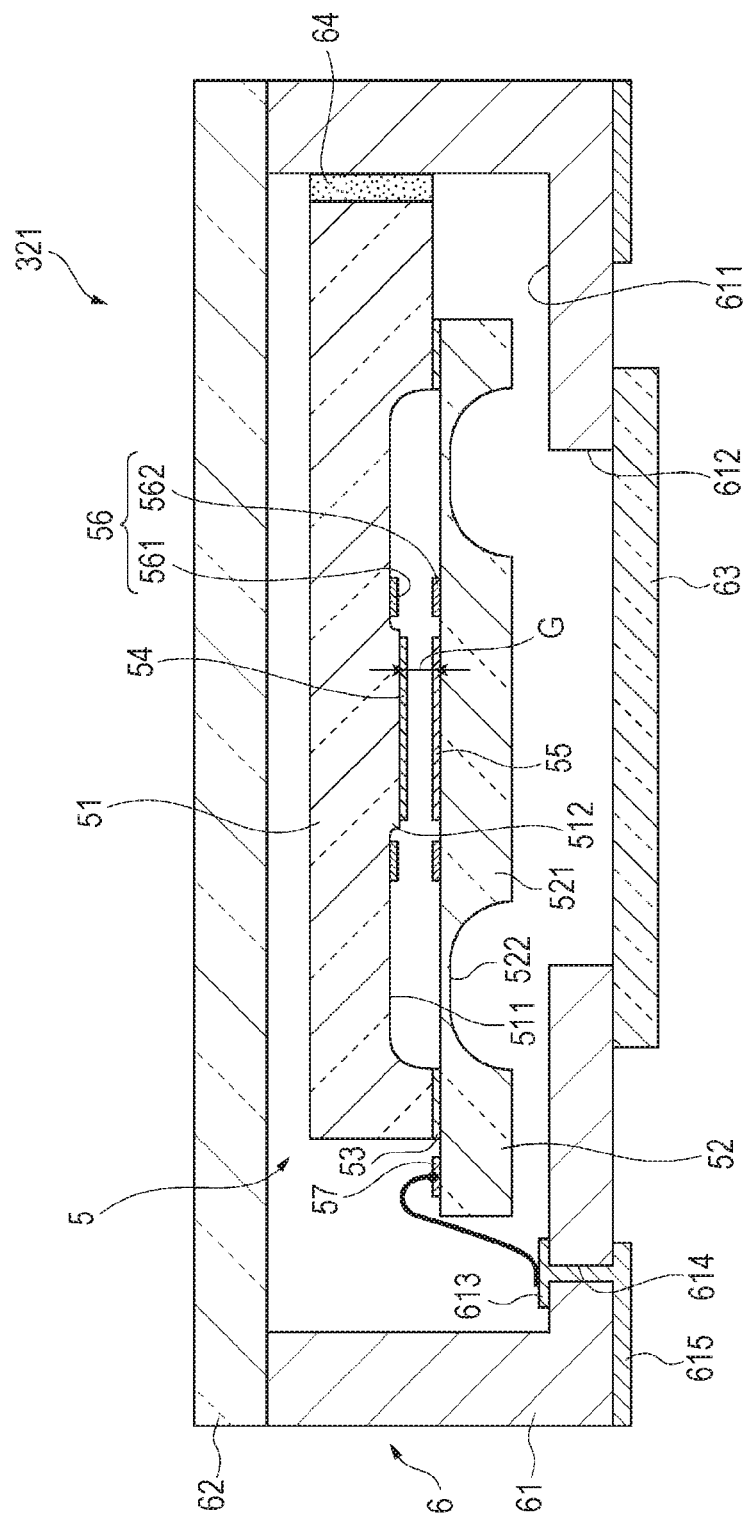
FIG. 4 is a sectional view schematically illustrating a spectroscopy device that includes a wavelength-selective interference filter (spectroscopy element) of the first embodiment.

FIG. 4 is a sectional view illustrating a schematic configuration of the spectroscopy device 321.

The spectroscopy device 321 includes a casing 6 and a wavelength-selective interference filter 5 (spectroscopy element) that is accommodated in the casing 6.

Configuration of Wavelength-Selective Interference Filter

The wavelength-selective interference filter 5 is a wavelength-selective Fabry-Perot etalon element and constitutes a spectroscopy element of the invention. While the present embodiment illustrates the wavelength-selective interference filter 5 as being arranged in the spectroscope 17 while being accommodated in the casing 6, the wavelength-selective interference filter 5, for example, may be configured to be directly arranged in the spectroscope 17.

The wavelength-selective interference filter 5 includes a light-transmissive fixed substrate 51 and a light-transmissive movable substrate 52 as illustrated in FIG. 4. The fixed substrate 51 and the movable substrate 52 are integrally configured by bonding with a bonding film 53. In the fixed substrate 51, disposed are a first groove portion 511 formed by etching and a second groove portion 512 having a smaller depth than the first groove portion 511. A fixed electrode 561 and a fixed reflecting film 54 are respectively disposed in the first groove portion 511 and in the second groove portion 512. The fixed reflecting film 54, for example, is configured of a metal film made of Ag or the like, an alloy film made of an Ag alloy or the like, a dielectric multilayer film made of a laminate of a high-refractive layer and a low-refractive layer, or a laminated body made of a laminate of a metal film (alloy film) and a dielectric multilayer film.

The movable substrate 52 includes a movable portion 521 and a holding portion 522 that is disposed outside of the movable portion 521 to hold the movable portion 521. On the face of the movable portion 521 facing the fixed substrate 51, disposed are a movable electrode 562 facing the fixed electrode 561 and a movable reflecting film 55 facing the fixed reflecting film 54. As the movable reflecting film 55, a reflecting film having the same configuration as the fixed reflecting film 54 is used. The holding portion 522 is a diaphragm that surrounds the movable portion 521 and is formed to have a smaller thickness dimension than the movable portion 521.

The fixed electrode 561 and the movable electrode 562 constitute an electrostatic actuator 56 in the wavelength-selective interference filter 5. Applying a voltage to the electrostatic actuator 56 can change the dimension of a gap G between the fixed reflecting film 54 and the movable reflecting film 55. In the peripheral portion of the movable substrate 52 (region not facing the fixed substrate 51), disposed is a plurality of electrode pads 57 that is individually connected to the fixed electrode 561 and to the movable electrode 562.

Configuration of Casing

The casing 6 includes a base 61 and a glass substrate 62 as illustrated in FIG. 4. The base 61 and the glass substrate 62 are bonded by, for example, low melting point glass bonding to form an accommodative space therein, and the wavelength-selective interference filter 5 is accommodated in the accommodative space.

The base 61 is configured of, for example, a laminate of thin ceramic plates and includes a recessed portion 611 that can accommodate the wavelength-selective interference filter 5. The wavelength-selective interference filter 5 is fixed to, for example, a side face of the recessed portion 611 of the base 61 by a fixing material 64. A light pass hole 612 is disposed on the bottom face of the recessed portion 611 of the base 61, and a cover glass 63 is bonded to the bottom face cover the light pass hole 612.

An inside terminal unit 613 is disposed in the base and is connected to the electrode pad 57 of the wavelength-selective interference filter 5. The inside terminal unit 613 is connected through a conductive hole 614 to an outside terminal unit 615 that is disposed outside of the base 61. The outside terminal unit 615 is electrically connected to the control unit 15.

Configuration of Light Receiver

Returning to FIG. 3, the light receiver 322 is arranged on the optical axis of the wavelength-selective interference filter 5 (straight line passing through the central points of the reflecting films 54 and 55), receives in a light receiving region light that is transmitted through the wavelength-selective interference filter 5, and outputs a detection signal (current value) that corresponds to the intensity of light received. The detection signal output by the light receiver 322 is input into the control unit 15 through an I-V converter (not illustrated), an amplifier (not illustrated), and an AD converter (not illustrated). The light receiving region of the light receiver 322 may be formed as an area having the same diameter as the spotlight (for example, a diameter of approximately 3.5 mm) around the central measurement point R or having a slightly larger diameter than the spotlight with an additional predetermined margin.

While the size of the light receiving region of the light receiver 322 is the same as the size of the range of measurement in the present embodiment, the size of the light receiving region, if a condenser lens or the like is separately disposed in the light receiving optical system 32, can be changed according to the magnification of the condenser lens.

Configuration of Reflecting Mirror and Reflecting Mirror Driver

The reflecting mirror 325 is a first reflecting mirror of the invention and reflects light that passes through the light-reception-side first aperture 323 toward the light-reception-side second aperture 324. The reflecting mirror 325 includes a drive shaft 3251 parallel to the Y direction and is disposed to be rotatable around the drive shaft 3251 as illustrated in FIG. 3.

More specifically, in the present embodiment, the principal ray of light that is incident at the central point of the light receiving region of the light receiver 322 (principal ray in the light receiving optical system 32) is reflected by the reflecting mirror 325 at a position of reflection M1, and the principal ray in the light receiving optical system is reflected light from the central measurement point R. The drive shaft 3251 holds the reflecting mirror 325 rotatably around the position of reflection M1. That is, the drive shaft 3251 is disposed on the rear side of the position of reflection M1 in the reflecting mirror 325.

The reflecting mirror driver 326 constitutes a first optical path adjusting unit of the invention with an optical path adjuster 154C (refer to FIG. 6), described later, and changes the angle of the reflecting mirror 325 by rotating the reflecting mirror 325. Specifically, the reflecting mirror driver 326 changes the angle of the reflecting mirror 325 with respect to the X direction by imparting rotational drive force to the drive shaft 3251 of the reflecting mirror 325. A specific configuration example is exemplified by a configuration including a stepping motor that changes the attitude of the reflecting mirror 325 by rotating the reflecting mirror 325 through transmission of rotational force of the stepping motor to the rotating shaft disposed in the reflecting mirror 325. In addition, any configuration such as a configuration that rotates the reflecting mirror 325 with drive force generated by an actuator device such as a polymer actuator may be used.

Figure 5A:
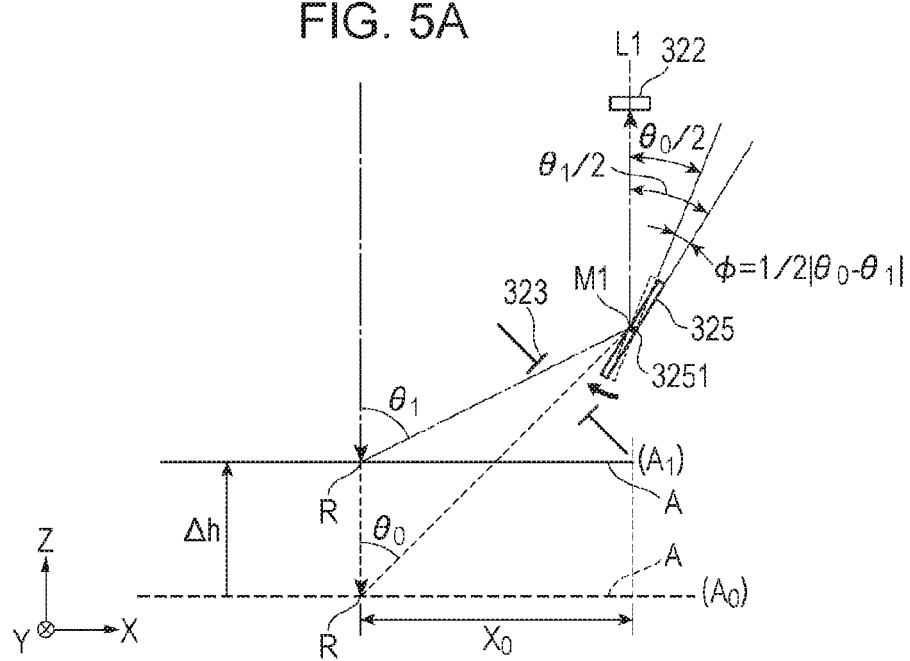
FIGS. 5A and 5B are diagrams illustrating an example of a central measurement position and an adjusted angle of a reflecting mirror according to a change in the distance between a medium and the spectroscope in the first embodiment.
Figure 5B:
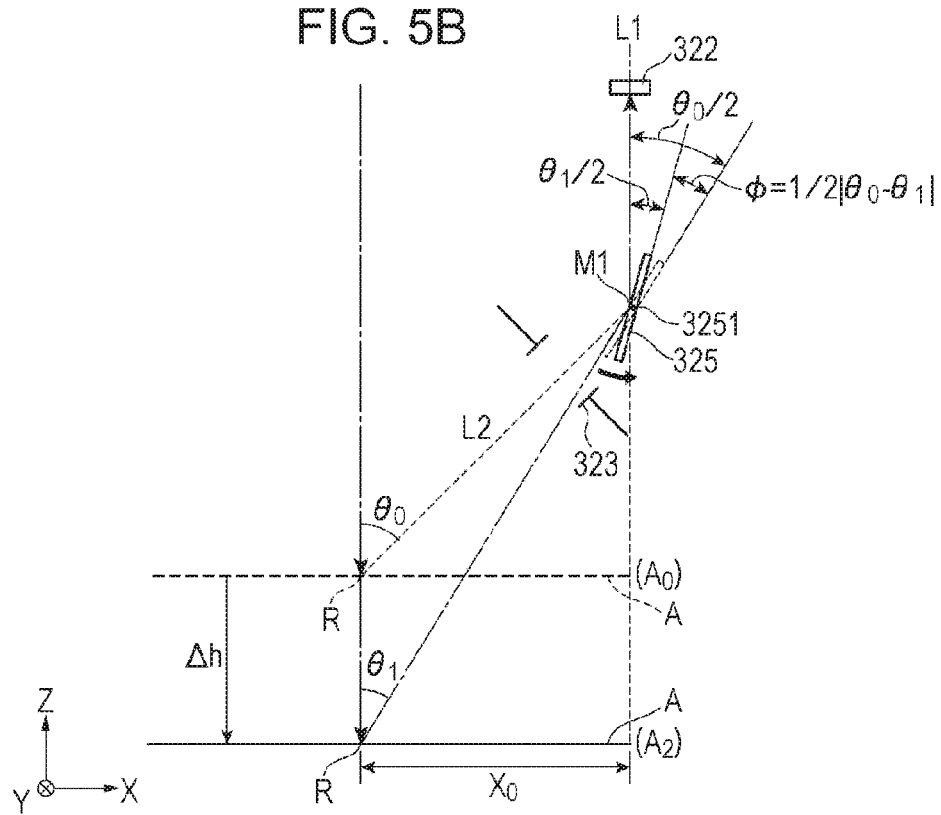

FIGS. 5A and 5B are diagrams illustrating an example of the position of the central measurement point R and the adjusted angle of the reflecting mirror 325 in the present embodiment when the distance between the medium A and the spectroscope 17 is changed. FIG. 5A illustrates a state $A_1$ where the distance between the medium A and the spectroscope 17 is decreased from an appropriate value (reference distance), and FIG. 5B illustrates a state $A_2$ where the distance between the medium A and the spectroscope is increased from the reference distance by Δh. For convenience of description, a change in the distance between the medium A and the spectroscope 17, the angle of reflection of reflected light at the central measurement point R, and the opening diameter of each aperture are exaggeratedly illustrated in FIGS. 5A and 5B. In actuality, the angle of reflection of the reflected light is required to be set to 45°±2° by the color measurement standard, and a change in the distance between the medium A and the spectroscope 17 is approximately a few mm. The light source 311, the spectroscopy device 321, and the apertures 312, 313, and 324 are not illustrated in FIGS. 5A and 5B.

As illustrated in FIGS. 5A and 5B, in a reference state $A_0$ where the distance between the medium A and the spectroscope 17 is equal to the reference distance, reflective light that is reflected at an angle of reflection of 45° from the central measurement point R in the spectrometry according to (0°:45° x) in the color measurement standard is reflected at the position of reflection M1 of the reflecting mirror 325 and is received by the light receiver 322 through the spectroscopy device 321.

In the present embodiment, if the distance between the medium A and the spectroscope 17 is changed, the angle of the reflecting mirror 325 is adjusted to cause the reflected light from the central measurement point R to incident at the central point of the light receiving region of the light receiver 322. At this time, there is no attitude change or movement of the light receiver 322. Thus, the angle of the reflecting mirror 325 is adjusted so that the optical path of light reflected at the predetermined position of reflection M1 in the reflecting mirror 325 matches a normal line L1 of the light receiver 322. The position of reflection M1 is not changed because the reflecting mirror 325 is rotated around the position of reflection M1.

The reflecting mirror driver 326, therefore, if the distance between the medium A and the spectroscope 17 is decreased, rotates the reflecting mirror 325 in the clockwise direction (direction in which the angle between the reflecting mirror 325 and the X direction decreases) to reflect light that is incident at the position of reflection M1 on the normal line L1 in the central portion of the light receiver 322 as illustrated in FIG. 5A. Meanwhile, if the distance between the medium A and the spectroscope 17 is increased, the reflecting mirror driver 326 rotates the reflecting mirror 325 in the counterclockwise direction (direction in which the angle between the reflecting mirror 325 and the X direction increases) to reflect the light incident at the position of reflection M1 on the normal line L1 of the light receiver 322 as illustrated in FIG. 5B. Accordingly, an optical path L2 of reflected light from the central measurement point R can be caused to match the optical axis of the light receiving optical system 32 that passes through the central point of the light receiving region of the light receiver 322.

The optical path L2 of the reflected light in the present embodiment is adjusted so that light reflected at the central point of a region illuminated by the illumination light on the medium A (light reflected at the central measurement point R) is incident at the central point of the light receiving region of the light receiver 322 even if the distance between the medium A and the spectroscope 17 is changed. That is, at least the dimension of the opening diameter of the light-reception-side first aperture 323 along the X direction is formed to be larger than the diametral dimension of the range of measurement according to the optical path adjustment.

The light-reception-side first aperture 323 may be disposed between the reflecting mirror 325 and the light-reception-side second aperture 324. In this case, the opening diameter of the light-reception-side first aperture 323 may be set to the size of the range of measurement (size of the light receiving region of the light receiver 322), in which case influence from stray light components can be suppressed, thereby improving measurement accuracy.

Configuration of Distance Sensor

The distance sensor 18 is a distance detector of the invention. The distance sensor 18 is disposed in the carriage 13 with the printing unit 16 and the spectroscope and detects the distance between the spectroscope 17 (carriage 13) and the medium A. The distance sensor 18 may be configured to be incorporated into the spectroscope 17.

The distance sensor 18 is exemplified by, for example, a sensor including a light source unit and a detector (for example, a complementary metal oxide semiconductor (CMOS) or a position sensitive detector (PSD)) that uses triangulation to calculate distance on the basis of the position of light received in the detector and the position of the light source unit by receiving light emitted from the light source unit and reflected by the medium A with the detector. If the distance sensor 18 is incorporated into the spectroscope 17, light of the light source 311 may be used as the light source unit.

In addition, it is possible to use a sensor or the like that separates reference light and measuring light from light of the light source unit, irradiates the medium A with the measuring light, and observes a change in interference fringe of combined light obtained by combining the measuring light reflected by the medium A and the reference light.

Configuration of Control Unit

The control unit 15 is configured to include an I/F 151, a unit controller circuit 152, a memory 153, and a central processing unit (CPU) 154 as illustrated in FIG. 2.

The I/F 151 inputs into the CPU 154 the print data that is input from the external apparatus 20.

The unit controller circuit 152 includes a controller circuit that controls each of the supply unit 11, the transport unit 12, the printing unit 16, the light source 311, the wavelength-selective interference filter 5, the light receiver 322, and the carriage moving unit 14 and controls operation of each unit on the basis of a command signal from the CPU 154. It is also possible that a controller circuit of each unit is disposed separately from the control unit 15 and is connected to the control unit 15.

The memory 153 stores various programs and various data that control operation of the printer 10.

Various data is exemplified by, for example, V-X data that represents the wavelength of light transmitted through the wavelength-selective interference filter 5 with respect to the voltage applied to the electrostatic actuator when the wavelength-selective interference filter 5 is controlled and printing profile data that stores the amount of each ink to be discharged with respect to color data which is included as the print data. In addition, the memory 153 may store light emitting characteristics of the light source 311 with respect to each wavelength, light receiving characteristics (light reception sensitivity characteristics) of the light receiver 322 with respect to each wavelength, and the like.

Figure 6:
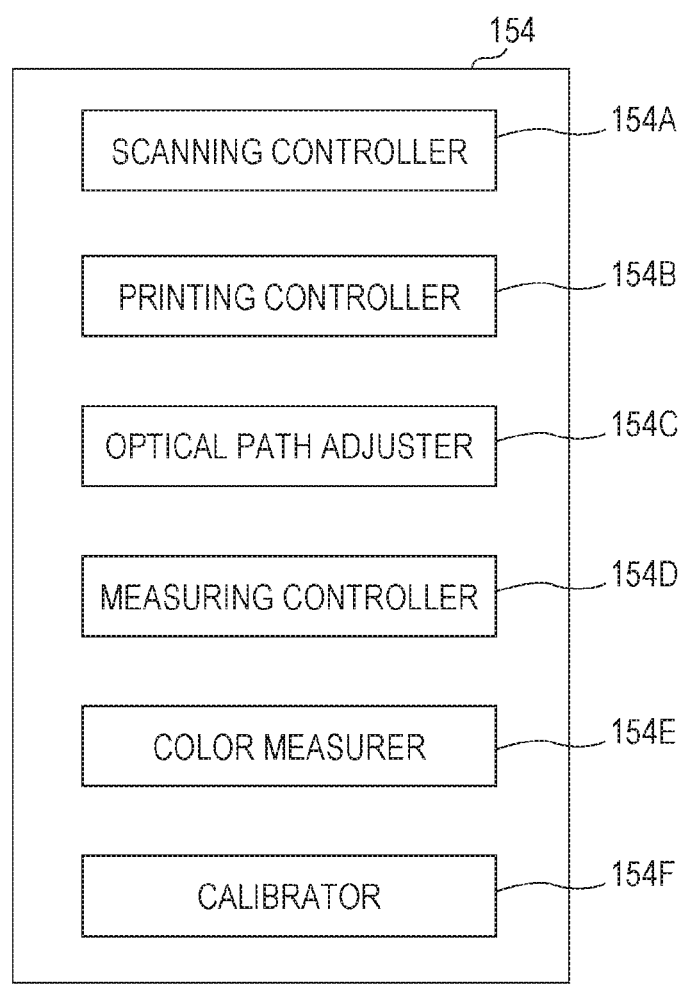
FIG. 6 is a block diagram illustrating each functional configuration of a control unit of the printer in the first embodiment.

FIG. 6 is a block diagram illustrating each functional configuration of the control unit 15 of the printer 10.

The CPU 154 functions as a scanning controller 154A, a printing controller 154B, an optical path adjuster 154C, a measuring controller 154D, a color measurer 154E, a calibrator 154F, and the like as illustrated in FIG. 6 by reading and executing various programs stored on the memory 153.

The scanning controller 154A outputs to the unit controller circuit 152 a command signal that indicates driving of the supply unit 11, the transport unit 12, and the carriage moving unit 14. Accordingly, the unit controller circuit 152 drives the roll drive motor of the supply unit 11 and supplies the medium A to the transport unit 12. The unit controller circuit 152 drives the transport motor of the transport unit 12 to transport a predetermined region of the medium A along the Y direction to a position on the platen 122 facing the carriage 13. The unit controller circuit 152 drives the carriage motor 142 of the carriage moving unit 14 to move the carriage 13 along the X direction.

The printing controller 154B outputs a command signal that indicates control of the printing unit 16 to the unit controller circuit 152 on the basis of, for example, the print data that is input from the external apparatus 20. When the command signal is output to the unit controller circuit 152 from the printing controller 154B, the unit controller circuit 152 outputs a printing control signal to the printing unit 16 to drive the piezoelectric element disposed in the nozzle and causes ink to be discharged to the medium A. When printing is performed, an image configured of a plurality of dots is printed on the medium A by alternately repeating a dot forming operation that moves the carriage 13 along the X direction and discharges ink from the printing unit 16 during the moving to form a dot and a transport operation that transports the medium A in the Y direction.

The optical path adjuster 154C constitutes the first optical path adjusting unit of the invention with the reflecting mirror driver 326 and outputs a command signal that indicates driving of the reflecting mirror driver 326 to the unit controller circuit 152 on the basis of the distance between the medium A and the spectroscope 17 detected by the distance sensor 18. Accordingly, a control signal is input into the reflecting mirror driver 326 from the unit controller circuit 152, and the reflecting mirror driver 326 rotates the reflecting mirror 325 in a direction based on the control signal.

The measuring controller 154D performs a spectrometry process. Specifically, the measuring controller 154D outputs a command signal for controlling the light source 311 to the unit controller circuit 152 and causes light to be emitted from the light source 311.

The measuring controller 154D reads a drive voltage for the electrostatic actuator 56 with respect to the wavelength of light transmitted through the wavelength-selective interference filter 5 from the V-λ data of the memory 153 and outputs a command signal to the unit controller circuit 152. Accordingly, the unit controller circuit 152 applies the drive voltage from the command signal to the wavelength-selective interference filter 5, and light of a desired transmitted wavelength is transmitted through the wavelength-selective interference filter 5.

The measuring controller 154D obtains the detection signal (intensity of received light) that is input from the light receiver 322 and stores the detection signal in association with the voltage applied to the electrostatic actuator 56 (or the wavelength of light transmitted through the wavelength-selective interference filter 5 that corresponds to the voltage) on the memory 153.

The color measurer 154E measures the intensity of color at the position of measurement that includes the central measurement point R on the basis of the intensity of received light with respect to light of a plurality of wavelengths obtained by spectrometry.

The calibrator 154F corrects (updates) the printing profile data on the basis of a color measurement result from the color measurer 154E.

Operation of each functional configuration in the control unit 15 will be described in detail later.

Spectroscopy Method

Next, a spectroscopy method in the printer 10 of the present embodiment will be described on the basis of the drawings.

Figure 7:
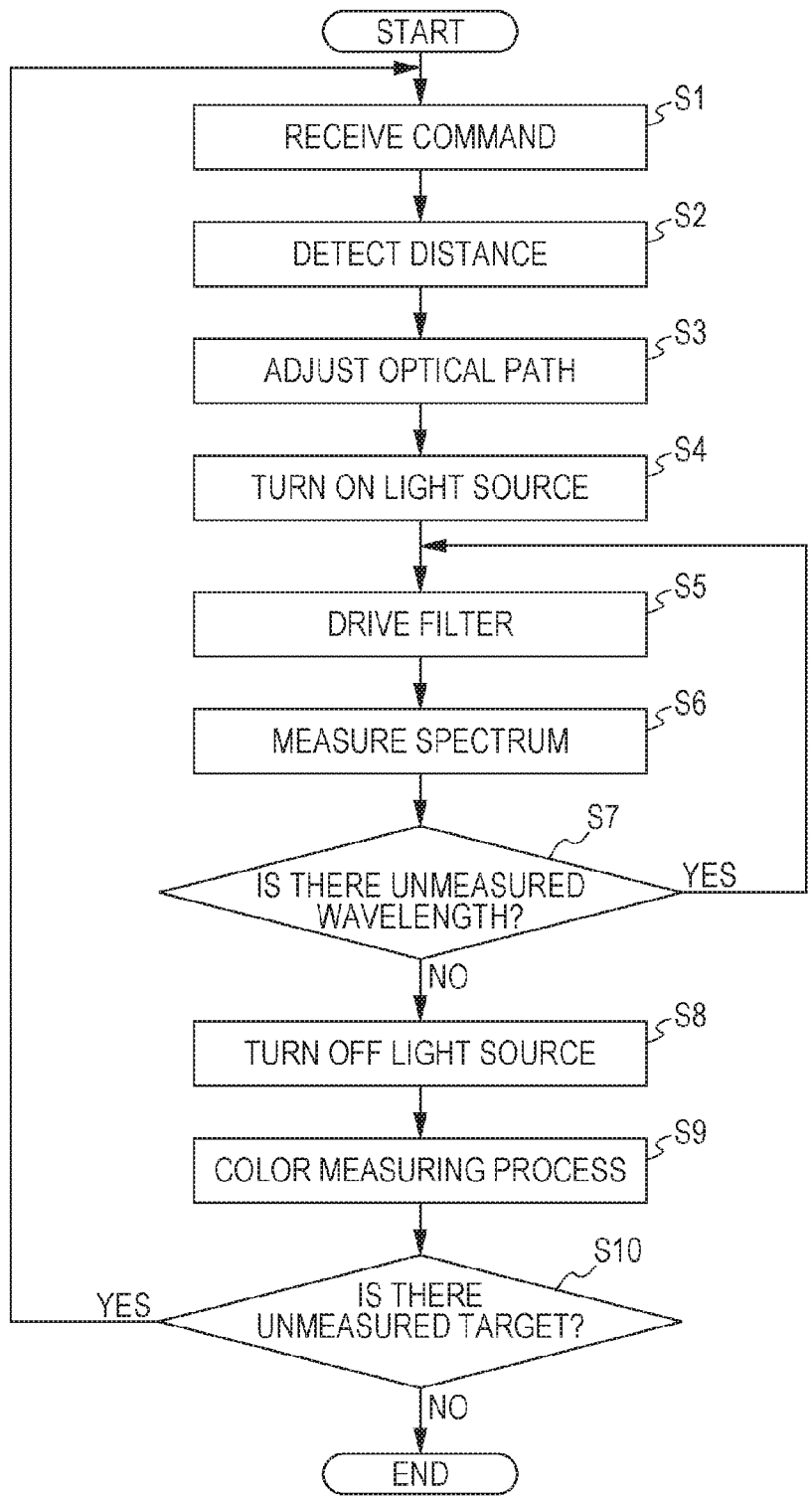
FIG. 7 is a flowchart illustrating a spectrometry method for the printer of the first embodiment.

FIG. 7 is a flowchart illustrating the spectroscopy method in the printer 10.

As a spectrometry process performed by the printer 10, for example, an example in which the spectrometry process is performed on a plurality of color patches printed by the printing unit 16 will be described.

In the spectrometry process of the present example, a command that indicates performing of the spectrometry process is received from, for example, user operation or input from the external apparatus 20 (Step S1).

When the command is received in Step S1, the scanning controller 154A controls the transport unit 12 and the carriage moving unit 14 to transport the medium A along the Y direction and to move the carriage 13 along the X direction so that the position of measurement is positioned on the color patch (so that the position of measurement is irradiated with the illumination light from the illumination optical system 31).

Then, the optical path adjuster 154C drives the distance sensor 18 to detect the distance between the medium A and the spectroscope 17 (Step S2).

Next, the optical path adjuster 154C changes the angle of rotation of the reflecting mirror 325 on the basis of the distance detected in Step S2 (Step S3: optical path adjustment).

Specifically, the optical path adjuster 154C calculates a difference (distance difference) Δh between the distance in the reference state Δh where no strain or the like is exerted on the medium $A_0$ and the distance detected in Step S2.

Given that the angle of reflection at the central measurement point R is θ, the angle between the reflecting mirror 325 and the normal line L1 at the central point of the light receiver 322 is θ/2. The angle of reflection at the central measurement point R in the reference state $A_0$ is designated by $θ_0$, and the angle of reflection at the central measurement point R when the distance between the medium A and the spectroscope 17 is changed by the distance difference Δh is designated by $θ_1$. When the distance between the medium A and the spectroscope 17 is changed by the distance difference Δh from the reference state $A_0$, changing the position of the reflecting mirror 325 by an angle θ illustrated in the following Expression (1) can cause reflected light from the central measurement point R to be incident at the center of the light receiving region of the light receiver 322.

$$φ=θ_0/2-θ_1/2 \quad (1)$$

The angle $θ_1$, given that the distance from the central measurement point R to the position of reflection M1 (central point of the light receiver 322) in the X direction is $X_0$, is represented as $θ_1=\tan^{-1}\{X_0/(X_0+Δh)\}$. Thus, Expression (1) is represented as the following Expression (2).

$$φ=[θ_0-\tan^{-1}\{X_0/(X_0+Δh)\}]/2 \quad (2)$$

In the present embodiment, the distance $X_0$ is measured in advance, for example, during manufacturing and is stored on the memory 153 with $θ_0=45°$ in the spectrometry according to (0°:45° x) in the color measurement standard. Thus, the optical path adjuster 154C can easily calculate the angle of the reflecting mirror 325 to change on the basis of Expression (2).

Then, the optical path adjuster 154C outputs a command signal to the unit controller circuit 152 so as to change the angle of the reflecting mirror 325 on the basis of the angle calculated by Expression (2). Accordingly, the reflecting mirror driver 326 controls, for example, the stepping motor on the basis of the command signal and changes the angle of the reflecting mirror 325.

If the angle φ is a negative value in Expression (2), the angle of the reflecting mirror 325 is changed in the clockwise direction (direction in which the angle between the reflecting mirror 325 and the X direction decreases) as illustrated in FIG. 5A. If the angle φ is a positive value, the angle of the reflecting mirror 325 is changed in the counterclockwise direction (direction in which the angle between the reflecting mirror 325 and the X direction increases) as illustrated in FIG. 5B.

Then, the measuring controller 154D turns on the light source 311 of the illumination optical system 31 (Step S4).

By Step S4, the area around the central measurement point R is irradiated with the illumination light from the illumination optical system 31. At this time, even if the distance between the medium A and the spectroscope 17 is changed, the optical path is adjusted so that reflected light at the central point of a range of illumination is received at the center of the light receiving region of the light receiver 322.

Thus, the central point of the range of illumination is the central measurement point R.

Then, the measuring controller 154D applies the drive voltage to the electrostatic actuator 56 of the wavelength-selective interference filter 5 on the basis of the V-λ data stored on the memory 153 (Step S5). Accordingly, light, of the reflected light incident on the light receiving optical system 32 from the central measurement point R, having a wavelength corresponding to the dimension of the gap between the reflecting films 54 and of the wavelength-selective interference filter 5 is transmitted and is received by the light receiver 322. The measuring controller 154D measures the intensity of light transmitted through the wavelength-selective interference filter 5 on the basis of the detection signal from the light receiver 322 (Step S6: spectrometry). The intensity of light measured is stored in association with the wavelength of the transmitted light on the memory 153.

Then, the measuring controller 154D determines whether there is an unmeasured wavelength (Step S7). That is, in the present embodiment, the intensity of light is measured in, for example, each wavelength (16 wavelengths) having an interval of 20 nm in the visible light region from 400 nm to 700 nm for one color patch. Therefore, the measuring controller 154D determines whether measurement is completed for 16 wavelengths and, if not completed, changes the voltage applied to the electrostatic actuator 56 and returns to Step S5.

If measurement is determined to be completed for all wavelengths in Step S7, the measuring controller 154D turns off the light source 311 (Step S8).

Then, the color measurer 154E performs a colorimetry process on the color patch on the basis of the intensity of light in each wavelength measured (Step S9).

Specifically, a spectral reflectance is calculated for the color patch from the intensity of light measured in each wavelength, and furthermore, a colorimetric value (for example, an XYZ value or an L*a*b* value) is calculated from the calculated spectral reflectance and is stored on the memory 153.

The color measurer 154E may output the calculated spectral reflectance or the colorimetric value to the external apparatus 20 or to a display or the like disposed in the printer 10 for display or may control the printing unit 16 to print the color measurement result.

Then, the measuring controller 154D determines whether there is an unmeasured target (Step S10).

If Step S10 is determined as Yes, the process returns to Step S1, and the scanning controller 154A controls the transport unit 12 and the carriage moving unit 14 to move the central measurement point R (central point of the range of illumination with the illumination light) in the spectroscope 17 to a subsequent color patch.

The process ends if Step S10 is determined as No. In this case, the calibrator 154F updates the printing profile data stored on the memory 153 on the basis of the color measurement result for each color patch.

Effect of Present Embodiment

The optical path adjuster 154C in the present embodiment adjusts the optical path L2 of the reflected light incident on the light receiving optical system 32 from the medium A according to the distance between the medium A and the spectroscope 17 measured by the distance sensor 18. Thus, even if the distance between the medium A and the spectroscope 17 is changed, the optical path can be adjusted according to the distance so that reflected light from the range of measurement is incident on the light receiver 322, and a high accuracy spectrometry process (colorimetry process) in which measurement error is reduced can be appropriately performed.

In addition, since the optical path of light incident on the light receiving optical system 32 is physically adjusted, influence from noise components is less received in comparison with, for example, a configuration in which the intensity of light is corrected according to the distance between the medium A and the spectroscope 17 on the basis of the detection signal from the light receiver 322. Thus, distance correction accuracy can be improved, and a high accuracy spectrometry process can be performed.

In the present embodiment, the optical path L2 of reflected light in the light receiving optical system 32 is adjusted so that reflected light at the central measurement point R, which is set to the central point of the range of irradiation irradiated with the illumination light, is incident at the central point of the light receiving region in the light receiver 322. Accordingly, the central measurement point R is positioned on the optical axis of reflected light in the light receiving optical system 32, and light in the range of measurement can be accurately guided to the light receiving region of the light receiver 322 even if the distance between the medium A and the spectroscope 17 is changed. Thus, measurement error can be more securely reduced, and high accuracy spectrometry can be performed.

In the present embodiment, the reflecting mirror 325 is disposed to be rotatable around the position of reflection M1, and the reflecting mirror driver 326 changes the angle of the reflecting mirror 325. The optical path adjuster 154C calculates the distance difference Δh according to the distance detected by the distance sensor 18, calculates on the basis of Expression (2) the angle φ at which the optical path L2 of reflected light from the central measurement point R matches the normal line L1 at the central point of the light receiving region of the light receiver 322, and controls the reflecting mirror driver 326 to change the angle of the reflecting mirror 325 by the angle φ.

In such a configuration, a signal line is not connected to the reflecting mirror 325 of which the attitude is changed. Thus, optical path adjustment can be performed by a simple configuration without a problem such as a break in the signal line due to driving.

In addition, the position of reflection M1 is set to the intersection of the normal line L1 at the central point of the light receiving region of the light receiver 322 with the reflecting mirror 325, and the reflecting mirror 325 is rotated around the position of reflection M1. Thus, the position of reflection M1 is not changed by the rotation of the reflecting mirror 325 and nor is the normal line L1 at the central point of the light receiving region in the light receiver 322. Therefore, optical path adjustment can be easily performed by only the rotation of the reflecting mirror 325 without a need to move the light receiver 322 or the spectroscopy device 321.

Second Embodiment

Next, a second embodiment according to the invention will be described.

In the first embodiment, the optical path adjuster 154C and the reflecting mirror driver 326, which are the first optical adjuster of the invention, change the attitude of the reflecting mirror 325 to match the optical path L2 of reflected light from the central measurement point R and the normal line L1 at the central point of the light receiver 322. Meanwhile, the second embodiment is different from the first embodiment in that parallel movement of the reflecting mirror 325 matches the optical path L2 of reflected light and the normal line L1 at the central point of the light receiving region of the light receiver 322.

Figure 8:
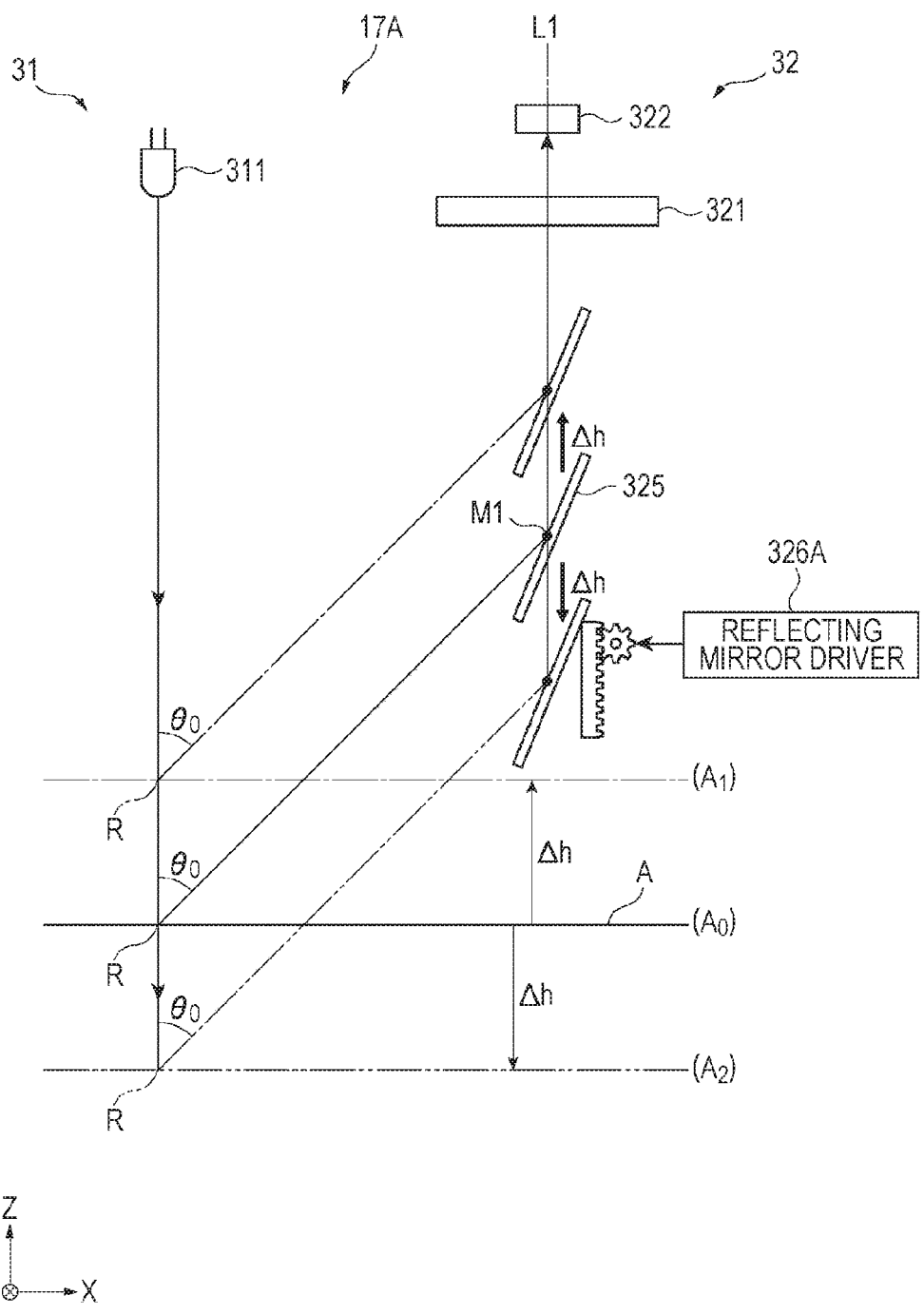
FIG. 8 is a schematic diagram illustrating a schematic configuration of a spectroscope and an optical path adjusting method of a second embodiment.

FIG. 8 is a schematic diagram illustrating an optical path adjusting method for a spectroscope 17A of the printer 10 according to the second embodiment. Each of the apertures 312, 313, 323, and 324 is not illustrated in FIG. 8. In addition, for a configuration that is previously described, a description thereof will be either omitted or simplified.

The spectroscope 17A of the present embodiment includes the illumination optical system 31 and the light receiving optical system 32 as illustrated in FIG. 8. The illumination optical system 31 has the same configuration as in the first embodiment and thus will not be described further.

The reflecting mirror 325 of the light receiving optical system 32 in the present embodiment includes, for example, a guide rail (not illustrated) along a Z direction and is disposed to be parallelly movable along the guide rail.

A reflecting mirror driver 326A of the present embodiment includes a drive source such as a stepping motor and parallelly moves the reflecting mirror 325 along the Z direction with drive force from the drive source.

A specific configuration example of the reflecting mirror driver 326A is exemplified by a configuration including a stepping motor and a gear array that transmits drive force from the stepping motor, the configuration in which rotational drive force from the stepping motor is transmitted to, for example, a rack extending in the Z direction that is disposed in the reflecting mirror 325. A configuration of the reflecting mirror driver 326A is not limited thereto. For example, a plurality of piezoelectric actuators may be disposed in the reflecting mirror 325, and the reflecting mirror 325 may be moved in the Z direction by applying a voltage to the actuators. Alternatively, the stepping motor may rotationally drive a belt to which a part of the reflecting mirror 325 is fixed.

In the present embodiment, light that is incident at the angle $\theta_0$ (in the range of 45°±2°) at the central measurement point R is required to be incident on the reflecting mirror 325. Thus, at least the dimension of the light-reception-side first aperture 323 along the X direction is set to be larger by the allowable amount of change in the distance between the medium A and the spectroscope 17A.

The light-reception-side first aperture 323 may be disposed between the reflecting mirror 325 and the light-reception-side second aperture 324 as in the first embodiment. In this case, the diameter of a pencil of light may be decreased to the size of the range of measurement (to the size of the light receiving region of the light receiver 322), in which case it is possible to prevent the problem that stray light is received by the light receiver 322.

Furthermore, in the present embodiment, the light-reception-side first aperture 323 may be moved simultaneously with the reflecting mirror 325 by the distance difference Δh in either the Z direction or in the X direction. In this case, the diameter of the pencil of light and the opening diameter of the light-reception-side first aperture 323 may be decreased to the size of the range of measurement. The reflecting mirror 325 is moved in the Z direction in the present embodiment. Thus, the light-reception-side first aperture 323 may be integrated with the reflecting mirror 325 and moved simultaneously with the reflecting mirror 325.

In a spectrometry process performed by the printer 10 of the present embodiment, the optical path adjuster 154C performs the following process in Step S3 illustrated in FIG. 7.

That is, in the present embodiment, the optical path adjuster 154C calculates the distance difference Δh between the distance between the medium A and the spectroscope 17A in the reference state $A_0$ and the distance detected in Step S2.

In addition, in the present embodiment, even if the position of the central measurement point R is changed in the Z direction, the reflecting mirror 325 is parallelly moved in the Z-axis direction that is parallel to the normal line L1 of the light receiver 322 so that reflective light reflected at the angle of reflection $\theta_0$ is incident at the central point of the light receiving region of the light receiver 322. Therefore, the optical path adjuster 154C may parallelly move the reflecting mirror 325 in the Z direction by the calculated distance difference Δh as illustrated in FIG. 8.

The optical path adjuster 154C moves the reflecting mirror 325 in a −Z direction (approaching to the medium A) if the distance detected by the distance sensor 18 is larger than the distance in the reference state $A_0$ and moves the reflecting mirror 325 in a +Z direction (receding from the medium A) if the detected distance is smaller than the distance in the reference state $A_0$.

Effect of Present Embodiment

In the present embodiment, the reflecting mirror 325 is disposed to be parallelly movable in the Z direction, and the optical path adjuster 154C controls the reflecting mirror driver 326A to parallelly move the reflecting mirror 325 along the Z direction.

Accordingly, as in the first embodiment, reflected light from the central measurement point R can be easily incident at the center of the light receiving region of the light receiver 322 by a simple configuration. In addition, reflective light reflected at $\theta_0$ (in the range of 45°±2°) at the central measurement point R is received by the light receiver 322 independently of the distance between the medium A and the spectroscope 17. Therefore, the angle of reflection is not deviated from the color measurement standard, and the spectrometry process can be appropriately performed.

Third Embodiment

Next, a third embodiment according to the invention will be described.

In the first and second embodiments, reflected light that is reflected at the central measurement point R and incident on the light receiving optical system 32 is received at the center of the light receiving region of the light receiver 322 by changing the attitude or position of the reflecting mirror 325 of the light receiving optical system 32. Meanwhile, the third embodiment is different from above each embodiment in that the light receiver 322 in the light receiving optical system 32 is moved.

Figure 9:
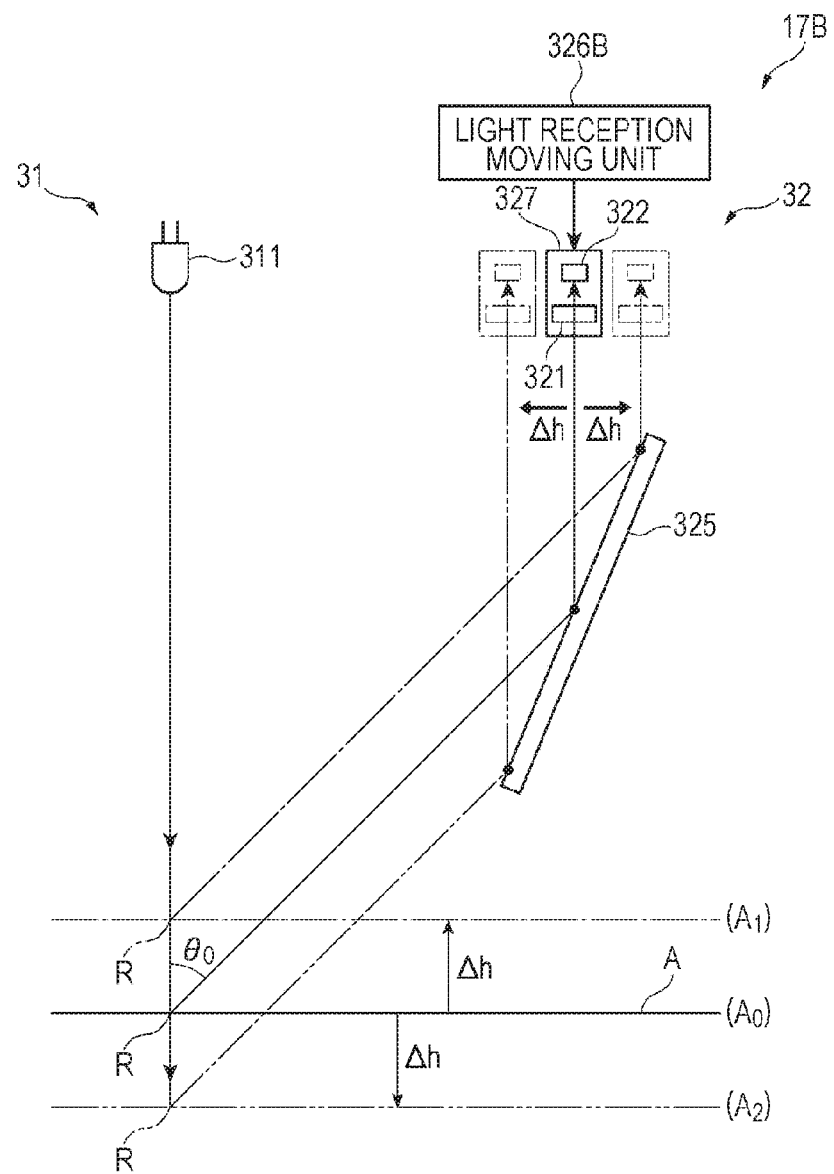
FIG. 9 is a schematic diagram illustrating a schematic configuration of a spectroscope and an optical path adjusting method of a third embodiment.

FIG. 9 is a schematic diagram illustrating an optical path adjusting method for a spectroscope 17B of the printer 10 according to the third embodiment. Each of the apertures 312, 313, 323, and 324 is not illustrated in FIG. 9.

The spectroscope 17B of the present embodiment includes the illumination optical system 31 and the light receiving optical system 32 as illustrated in FIG. 9. The illumination optical system 31 has the same configuration as in the first embodiment and thus will not be described further.

In the light receiving optical system 32 of the present embodiment, the reflecting mirror 325 is fixed, and the spectroscopy device 321 and the light receiver 322 are movable along the X direction. Specifically, the spectroscopy device 321 and the light receiver 322 are incorporated into a light receiving unit 327, and the light receiving unit 327 is movable along the X direction.

The light receiving optical system 32 includes a light reception moving unit 326B that moves the light receiving unit 327 in the X direction. The light reception moving unit 326B constitutes the first optical path adjusting unit of the invention with the optical path adjuster 154C.

A configuration of the light reception moving unit 326B can be illustrated by approximately the same configuration as the reflecting mirror driver 326A that moves the reflecting mirror 325 in the second embodiment. That is, the light reception moving unit 326B is exemplified by a configuration including a stepping motor and a gear array that transmits drive force from the stepping motor, the configuration in which rotational drive force from the stepping motor is transmitted to, for example, a rack extending in the X direction that is disposed in the light receiving unit 327. A configuration of the light reception moving unit 326B is not limited thereto. For example, a plurality of piezoelectric actuators may be disposed in the light receiving unit 327, and the light receiving unit 327 may be moved in the X direction by applying a voltage to the actuators. Alternatively, the stepping motor may rotationally drive a belt to which a part of the light receiving unit 327 is fixed.

While the light reception moving unit 326B moves in the X direction the spectroscopy device 321 and the light receiver 322 which are integrally configured as the light receiving unit 327, a filter moving mechanism that moves the spectroscopy device 321 in the X direction and a light receiver moving mechanism that moves the light receiver 322 in the X direction, for example, may be separately disposed.

In the present embodiment, at least the dimensions of the light-reception-side first aperture 323 and the light-reception-side second aperture 324 along the X direction are formed to be larger than the size of the light receiving region of the light receiver 322 by the allowable amount of change in the distance between the medium A and the spectroscope 17B. In actuality, as described above, the angle of reflection of the reflected light is required to be set to 45°±2° by the color measurement standard, and a change in the distance between the medium A and the spectroscope 17B is approximately 1 mm to 2 mm. Thus, the opening diameter of each of the apertures 323 and 324 is increased by approximately 1 mm to 2 mm, and a decrease in measurement accuracy due to stray light is substantially ignorable.

The light-reception-side first aperture 323 and the light-reception-side second aperture 324 may be movable respectively in the Z direction and in the X direction. In this case, the light reception moving unit 326B moves each of the apertures 323 and 324 in addition to the light receiving unit 327 by the distance difference Δh.

The light-reception-side first aperture 323 may be disposed between the reflecting mirror 325 and the light-reception-side second aperture 324, and the apertures 323 and 324 may be moved along the X direction. In this case, by disposing the light-reception-side first aperture 323 and the light-reception-side second aperture 324 in the light receiving unit 327, the light reception moving unit 326B can simultaneously move the spectroscopy device 321, the light receiver 322, and each of the apertures 323 and 324 in the X direction by the distance difference Δh by moving the light receiving unit 327 in the X direction.

In the spectrometry process performed by the printer 10 of the present embodiment, the optical path adjuster 154C calculates the amount of movement of the light receiving unit 327 and moves the light receiving unit 327 in Step S3 illustrated in FIG. 7 in the same method as in the second embodiment. That is, in the present embodiment, the optical path adjuster 154C calculates the distance difference Δh and parallelly moves the light receiving unit 327 (spectroscopy device 321 and light receiver 322) in the X direction by the calculated distance difference Δh.

Effect of Present Embodiment

In the present embodiment, the light receiver 322 is movable, and the optical path adjuster 154C controls the light reception moving unit 326B to parallelly move the light receiver 322.

As such, in the method of moving the light receiver 322, light in the range of measurement can be incident in the light receiving region of the light receiver 322 as in the first and second embodiments, and a high accuracy spectrometry process in which measurement error is reduced can be performed.

Furthermore, by parallelly moving the light receiver 322, reflective light that is reflected at $\theta_0$ (in the range of 45°±2°) at the central measurement point R can be received by the light receiver 322 independently of the distance between the medium A and the spectroscope 17 as in the second embodiment. Therefore, a spectrometry process that complies with the color measurement standard can be appropriately performed.

The light reception moving unit 326B moves the spectroscopy device 321 with the light receiver 322 in the present embodiment. Thus, even if the size of the reflecting films 54 and 55 of the wavelength-selective interference filter 5 is small and is, for example, approximately the same size as the range of measurement or the light receiving region of the light receiver 322, reflected light from the range of measurement can be incident on the reflecting films 54 and 55, and light of a desired wavelength can be transmitted through the spectroscopy device 321 and received by the light receiver 322.

Furthermore, in the present embodiment, the spectroscopy device 321 and the light receiver 322 are incorporated into the light receiving unit 327, and the light reception moving unit 326B moves the light receiving unit 327 along the X direction. Therefore, a configuration is simplified in comparison with a case where the spectroscopy device 321 and the light receiver 322 are individually driven.

Fourth Embodiment

Next, a fourth embodiment according to the invention will be described.

While the third embodiment illustrates a configuration that parallelly moves the spectroscopy device 321 and the light receiver 322, the fourth embodiment is different from the third embodiment in that the spectroscopy device and the light receiver are pivoted.

Figure 10:
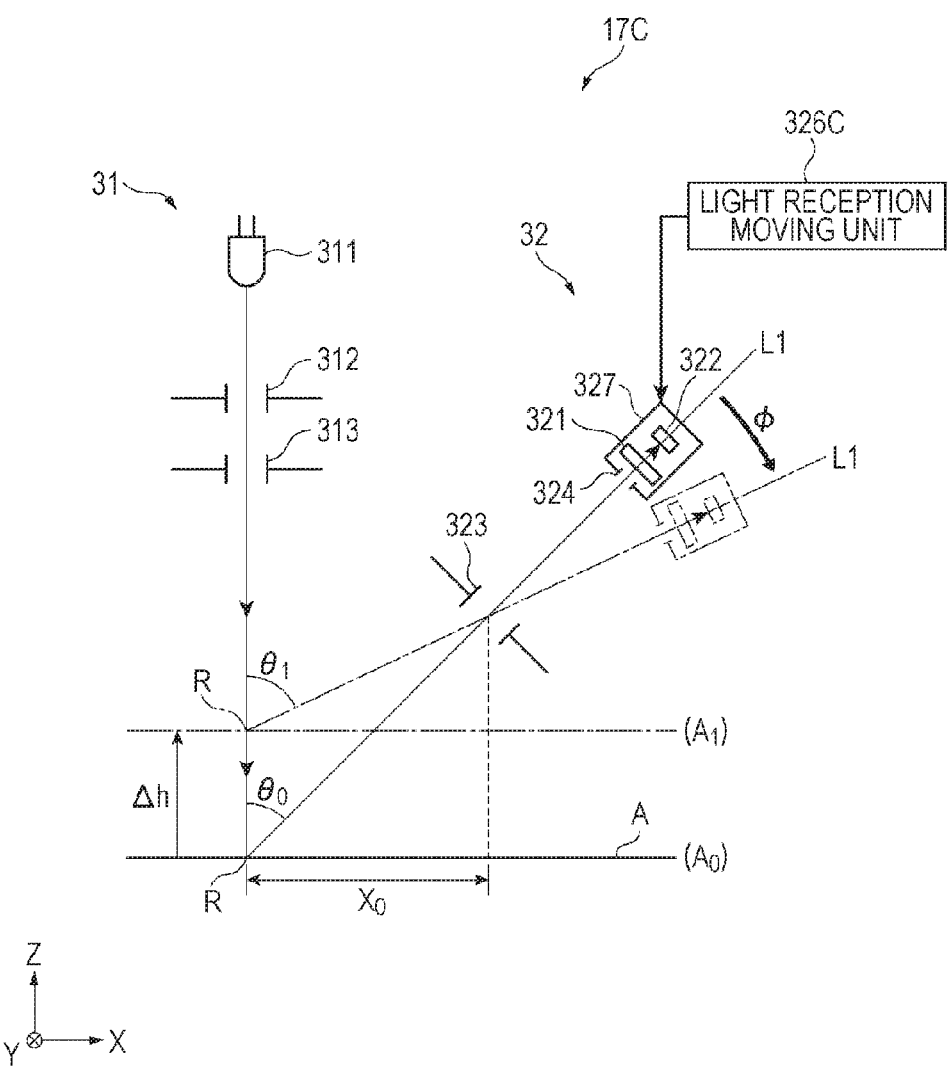
FIG. 10 is a schematic diagram illustrating a schematic configuration of a spectroscope and an optical path adjusting method of a fourth embodiment.

FIG. 10 is a diagram illustrating a schematic configuration of a spectroscope 17C of the fourth embodiment and an optical path adjusting method for the spectroscope 17C.

In the present embodiment, as illustrated in FIG. 10, reflective light that is reflected by the medium A is received by the light receiver 322 through the light-reception-side first aperture 323, the light-reception-side second aperture 324, and the spectroscopy device 321 without being reflected by the reflecting mirror 325.

In addition, in the present embodiment, the position of the light-reception-side first aperture 323 is fixed, and the spectroscopy device 321 and the light receiver 322 are disposed to be pivotable around an axis of pivoting that passes through the center of the opening of the light-reception-side first aperture 323 and is parallel to the Y direction. The light-reception-side second aperture 324 may be formed to have an opening diameter that is larger by the allowable amount of change in the distance between the medium A and the spectroscope 17C or may be pivoted along with the spectroscopy device 321 and the light receiver 322.

As a specific configuration, the light receiving unit 327 into which the spectroscopy device 321 and the light receiver 322 are incorporated may be pivotable as in the third embodiment, and the light-reception-side second aperture 324 may also be incorporated into the light receiving unit 327 if the light-reception-side second aperture 324 is simultaneously pivoted.

A light reception moving unit 326C of the present embodiment pivots the light receiving unit 327 around the center of the opening of the light-reception-side first aperture 323. A specific configuration example is exemplified by, for example, a configuration in which the light receiving unit 327 is fixed to a pivoting member of which the axis of rotation is set to the axis that passes through the center of the opening of the light-reception-side first aperture 323 and in which rotational drive force from a stepping motor is transmitted to the pivoting member.

In a spectrometry process performed by the printer 10 of the present embodiment, the optical path adjuster 154C performs the following process in Step S3 illustrated in FIG. 7.

That is, in the present embodiment, if a movement of the medium A from the reference state $A_0$ to a predetermined state $A_1$ changes the angle of reflection from $\theta_0$ to $\theta_1$, reflected light at the central measurement point R can be incident at the center of the light receiving region of the light receiver 322 by rotating the light receiving unit 327 by the angle $\phi = \theta_0 - \theta_1$.

Therefore, the optical path adjuster 154C of the present embodiment calculates the distance difference $\Delta h$ on the basis of the distance detected in Step S2. In addition, given that $X_0$ is the distance from the central measurement point R to the center of the opening of the light-reception-side first aperture 323 along the X direction, the angle of reflection $\theta_1 = \tan^{-1} \{X_0/(X_0 + \Delta h)\}$ is calculated. Accordingly, the optical path adjuster 154C calculates the angle $\phi$ ($= \theta_0 - \theta_1$) and controls the light reception moving unit 326C to pivot the light receiving unit 327 by the calculated angle $\phi$. If the calculated angle $\phi$ is a negative value, the light receiving unit 327 is pivoted in the clockwise direction (direction approaching to the medium A) in the state illustrated in FIG. 10 (state where reflected light advances in a +X direction). If the angle $\phi$ is a positive value, the light receiving unit 327 is pivoted in the counterclockwise direction (direction receding from the medium A).

Effect of Present Embodiment

In the present embodiment, the optical path adjuster 154C and the light reception moving unit 326C pivot the light receiver 322 around the center of the opening of the light-reception-side first aperture 323. In this case, light reflected in the range of measurement can be guided to the light receiving region of the light receiver 322 as in above each embodiment, and high accuracy spectrometry can be performed.

In addition, since the spectroscopy device 321 and the light receiver 322 are incorporated into the light receiving unit 327 as in the third embodiment, the light reception moving unit 326C, by pivoting the light receiving unit 327, can pivot the spectroscopy device 321 by the angle of pivoting of the light receiver 322. Therefore, a configuration is simplified in comparison with a case where the spectroscopy device 321 and the light receiver 322 are individually driven. In addition, spectroscopy can be performed on the reflected light from the range of measurement even if the size of the reflecting films 54 and 55 of the wavelength-selective interference filter 5 is, for example, approximately the same size as the light receiving region of the light receiver 322.

Fifth Embodiment

Next, a fifth embodiment according to the invention will be described.

The light receiving unit 327 is pivoted around the light-reception-side first aperture 323 in the fourth embodiment. Meanwhile, the fifth embodiment is different from the fourth embodiment in that the light receiver 322 is rotated.

Figure 11:
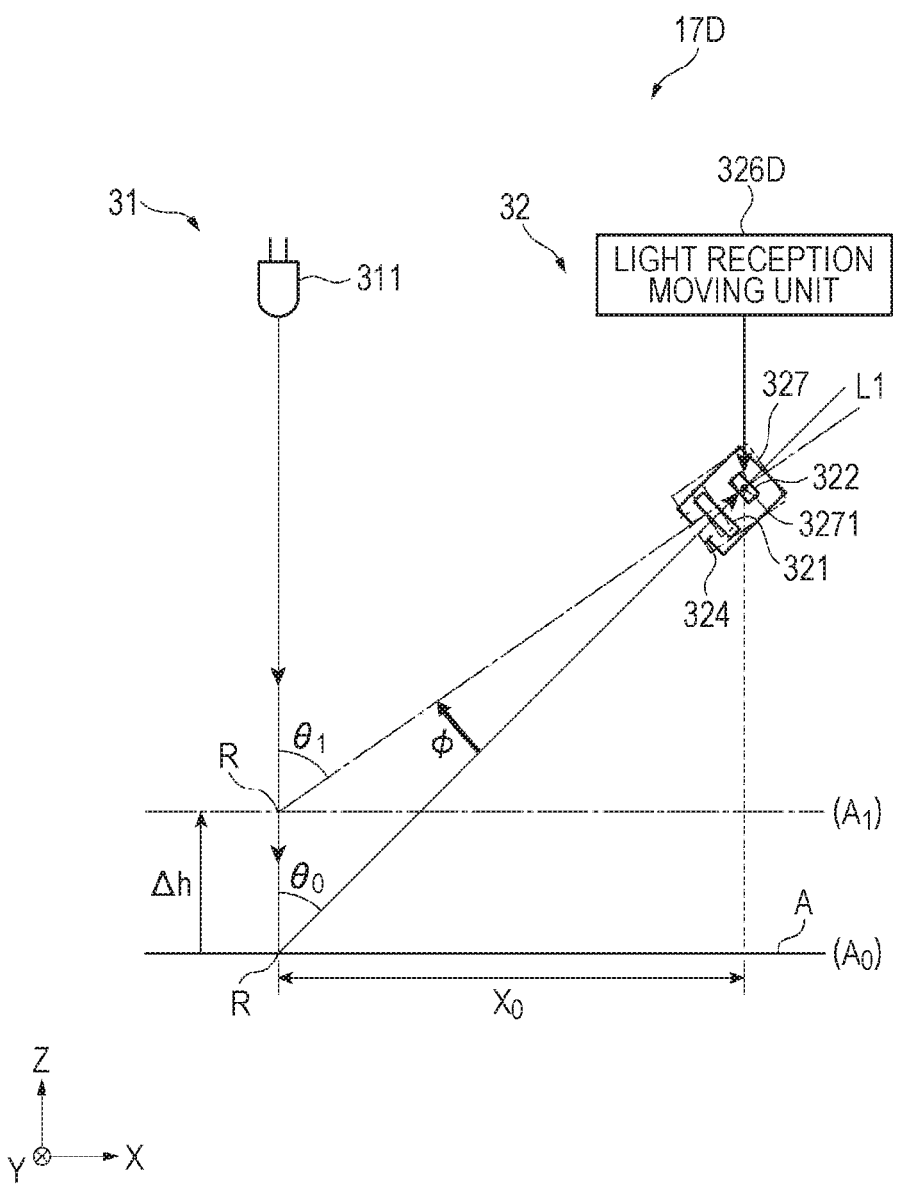
FIG. 11 is a schematic diagram illustrating a schematic configuration of a spectroscope and an optical path adjusting method of a fifth embodiment.

FIG. 11 is a diagram illustrating a schematic configuration of a spectroscope 17D of the fifth embodiment and an optical path adjusting method for the spectroscope 17D. The apertures 312, 313, and 323 are not illustrated in FIG. 11.

In the present embodiment, the light receiver 322 is rotatable around an axis that passes through the central point of the light receiving region and is parallel to the Y axis as illustrated in FIG. 11. The spectroscopy device 321 is disposed to be pivotable around the center of rotation of the light receiver 322.

In the present embodiment, the light-reception-side apertures 323 and 324 may be formed to have a larger opening diameter according to the allowable amount of change in the distance between the medium A and the spectroscope 17D or may be pivoted along with the spectroscopy device 321.

As a specific configuration, a pivoting shaft 3271 that passes through the center of the light receiving region of the light receiver 322 and is parallel to the Y direction is disposed in the light receiving unit 327 into which the spectroscopy device 321 and the light receiver 322 are incorporated. If the apertures 323 and 324 are simultaneously pivoted, the apertures 323 and 324 are also incorporated into the light receiving unit 327.

A light reception moving unit 326D of the present embodiment rotates the light receiving unit 327 around the pivoting shaft 3271 of the light receiver 322. A specific configuration can be illustrated by the same configuration as the reflecting mirror driver 326 in the first embodiment and is exemplified by, for example, a configuration in which rotational drive force from a stepping motor is transmitted to the pivoting shaft 3271 of the light receiver 322.

In a spectrometry process performed by the printer 10 of the present embodiment, the optical path adjuster 154C, as in the fourth embodiment, calculates the angle $\phi = \theta_0 - \theta_1$ and pivots the light receiving unit 327 by the calculated angle $\phi$ in Step S3 illustrated in FIG. 7. If the calculated angle $\phi$ is a negative value, the light receiving unit 327 is rotated in the clockwise direction in the state illustrated in FIG. 11 (state where reflected light advances in a +X direction). If the angle $\phi$ is a positive value, the light receiving unit 327 is rotated in the counterclockwise direction.

Effect of Present Embodiment

In the present embodiment, the optical path adjuster 154C and the light reception moving unit 326D rotate the light receiver 322. In this case, light reflected in the range of measurement can be guided to the light receiving region of the light receiver 322 as in above each embodiment, and high accuracy spectrometry can be performed.

In addition, since the spectroscopy device 321 and the light receiver 322 are incorporated into the light receiving unit 327 as in the third and fourth embodiments, the light reception moving unit 326C, by rotating the light receiving unit 327, can pivot the spectroscopy device 321 by the angle of rotation of the light receiver 322. Therefore, a configuration is simplified in comparison with a case where the spectroscopy device 321 and the light receiver 322 are individually driven. In addition, spectroscopy can be performed on the reflected light from the range of measurement even if the size of the reflecting films 54 and 55 of the wavelength-selective interference filter 5 is, for example, approximately the same size as the light receiving region of the light receiver 322.

Sixth Embodiment

Next, a sixth embodiment of the invention will be described.

In the first to fifth embodiments, spectrometry is performed according to (0°:45° x) geometrical optics condition defined by the color measurement standard (JIS Z 8722), and optical adjustment is performed so that reflected light that is incident on the light receiving optical system 32 is incident on the light receiver 322.

Meanwhile, the sixth embodiment is different from above each embodiment in that spectrometry is performed according to (45° x:0°) geometrical optics condition defined by the color measurement standard (JIS Z 8722) and that the optical path in the illumination optical system 31 is adjusted.

Figure 12:
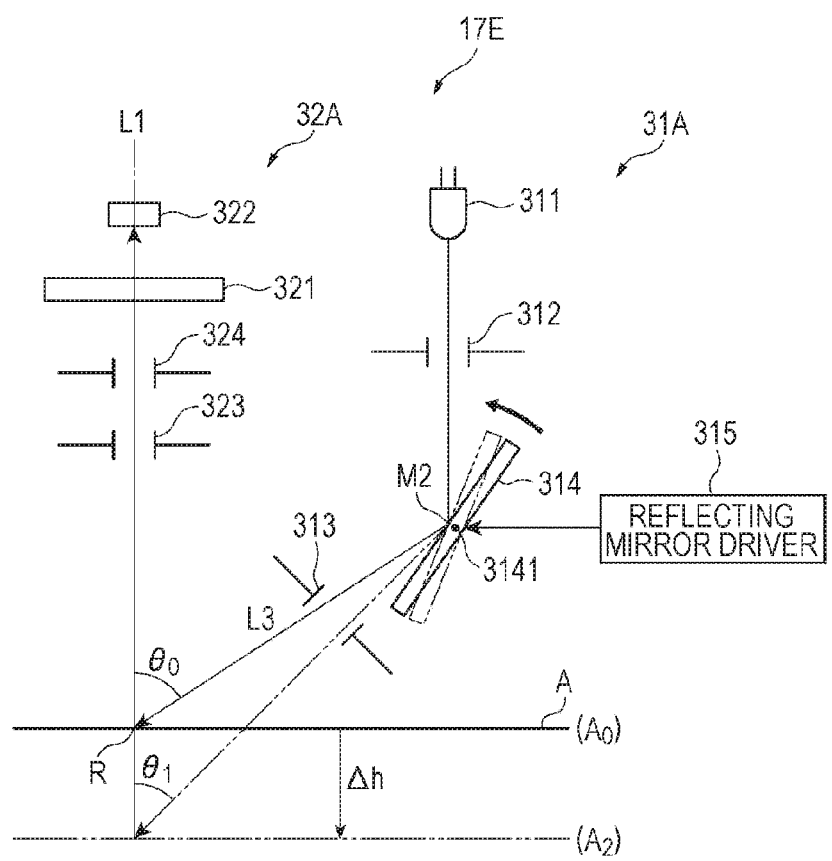
FIG. 12 is a schematic diagram illustrating a schematic configuration of a spectroscope and an optical path adjusting method of a sixth embodiment.

FIG. 12 is a diagram illustrating a schematic configuration of a spectroscope 17E of the sixth embodiment and an optical path adjusting method for the spectroscope 17E.

As illustrated in FIG. 12, the spectroscope 17E of the present embodiment includes an illumination optical system 31A that irradiates the medium A with light at 45°±2° and a light receiving optical system 32A that receives (at an allowable angle less than 10°) reflective light reflected at the central measurement point R of the medium A in the direction of the normal line (Z direction).

The illumination optical system 31A includes the light source 311 that is described above as being incorporated into the illumination optical system 31, the illumination-side first aperture 312, the illumination-side second aperture 313, an illumination-side reflecting mirror 314, and a reflecting mirror driver 315 and irradiates the medium A with illumination light.

The light source 311, for example, emits light in the Z direction. The illumination-side first aperture 312 narrows light emitted from the light source 311 and passes part of the emitted light toward the illumination-side reflecting mirror 314. The illumination-side second aperture 313 is disposed at the rear of the illumination-side reflecting mirror 314 and passes light that is incident on the illumination-side reflecting mirror 314 toward the central measurement point R.

The illumination-side reflecting mirror 314 is a second reflecting mirror of the invention and reflects light that passes through the illumination-side first aperture 312 toward the illumination-side second aperture 313. The illumination-side reflecting mirror 314 includes a drive shaft 3141 parallel to the Y direction and is disposed to be rotatable around the drive shaft 3141. Specifically, a point in the surface of the reflecting mirror 314 on the optical axis of the illumination-side first aperture 312 is set as a position of reflection M2 at which light is reflected toward the central measurement point R, and the drive shaft 3141 holds the reflecting mirror 314 rotatably around the position of reflection M2. That is, the drive shaft 3141 is disposed on the rear side of the position of reflection M2 in the reflecting mirror 314.

The reflecting mirror driver 315 constitutes a second optical path adjusting unit of the invention with the optical path adjuster 154C and rotates the illumination-side reflecting mirror 314. Specifically, the reflecting mirror driver 315 changes the angle of the reflecting mirror 314 with respect to the X direction by imparting rotational drive force to the drive shaft 3141 of the illumination-side reflecting mirror 314. A specific configuration thereof is the same as the reflecting mirror driver 326 in the first embodiment.

The light receiving optical system 32A includes the spectroscopy device 321, the light receiver 322, the light-reception-side first aperture 323, and the light-reception-side second aperture 324. Each of these configurations is approximately the same as in the first to fifth embodiments, and the only difference therebetween is a predetermined position to which each configuration is fixed. Thus, the configurations will not be described further.

The light receiving optical system 32A is disposed in the direction of the normal line of the central measurement point R in the present embodiment. Thus, even if the distance between the medium A and the spectroscope 17E is changed, the central measurement point R is not shifted in the X direction. Therefore, in the present embodiment, the angle of the reflecting mirror 314 is adjusted against shifting of the central measurement point R in the Z direction so that a principal ray L3 of the illumination light matches the central measurement point R. In this case, in order to irradiate with the illumination light the central measurement point R of which the position is shifted in the Z direction, at least the dimension of the opening diameter of the illumination-side second aperture 313 along the X direction is formed to be larger than the diametral dimension of the range of measurement.

The illumination-side second aperture 313 may be disposed between the reflecting mirror 314 and the illumination-side first aperture 312.

Spectrometry is performed in the printer 10 of the present embodiment by the same process as in the first embodiment. That is, in the present embodiment, the optical path adjuster 154C calculates the angle $\phi$ on the basis of Expression (2) and rotates the illumination-side reflecting mirror 314 by the angle $\phi$ in Step S3. If the calculated angle $\phi$ is a negative value, the angle of the illumination-side reflecting mirror 314 is changed in the clockwise direction (direction in which the angle between the illumination-side reflecting mirror 314 and the X direction decreases). If the angle $\phi$ is a positive value, the angle of the illumination-side reflecting mirror 314 is changed in the counterclockwise direction (direction in which the angle between the illumination-side reflecting mirror 314 and the X direction increases).

Effect of Present Embodiment

The optical path adjuster 154C in the present embodiment adjusts the optical path of light from the light source 311 of the illumination optical system 31A, which irradiates the medium A with the illumination light, according to the distance between the medium A and the spectroscope 17E detected by the distance sensor 18. Thus, even if the distance between the medium A and the spectroscope 17E is changed, the optical path can be adjusted according to the distance so that the range of measurement is irradiated with the illumination light, and a high accuracy spectrometry process (colorimetry process) in which measurement error is reduced can be appropriately performed.

In addition, since the optical path of light emitted from the light source 311 of the illumination optical system 31A is physically adjusted, influence from noise is less received in comparison with, for example, a configuration in which the intensity of light is corrected according to the distance between the medium A and the spectroscope 17E on the basis of the detection signal from the light receiver 322. Thus, distance correction accuracy can be improved, and a high accuracy spectrometry process can be performed.

In the present embodiment, the optical path of light from the light source 311 is adjusted so that the principal ray L3 of the illumination light matches the central measurement point R. Thus, even if the distance between the medium A and the spectroscope 17E is changed, the range of measurement can be irradiated with light that has the same intensity and a uniform intensity distribution. Accordingly, measurement error can be more securely reduced, and high accuracy spectrometry can be performed.

In the present embodiment, the illumination-side reflecting mirror 314 is disposed to be rotatable around the position of reflection M2, and the reflecting mirror driver 315 changes the angle of the illumination-side reflecting mirror 314. The optical path adjuster 154C calculates the distance difference Δh according to the distance detected by the distance sensor 18 and calculates the angle φ for matching the principal ray L3 of the illumination light and the central measurement point R on the basis of Expression (2). The optical path of light emitted from the light source 311 is adjusted by rotating the illumination-side reflecting mirror 314 by the calculated angle φ.

In such a configuration, a signal line is not connected to the illumination-side reflecting mirror 314 of which the attitude is changed. Thus, optical path adjustment can be performed by a simple configuration without a problem such as a break in the signal line due to driving.

Seventh Embodiment

Next, a seventh embodiment according to the invention will be described.

In the sixth embodiment, optical path adjustment in the illumination optical system 31A is performed by changing the attitude of the illumination-side reflecting mirror 314 so that the principal ray of the illumination light matches the central measurement point R. Meanwhile, the seventh embodiment is different from the sixth embodiment in that the principal ray of the illumination light matches the central measurement point R by parallelly moving the illumination-side reflecting mirror 314.

Figure 13:
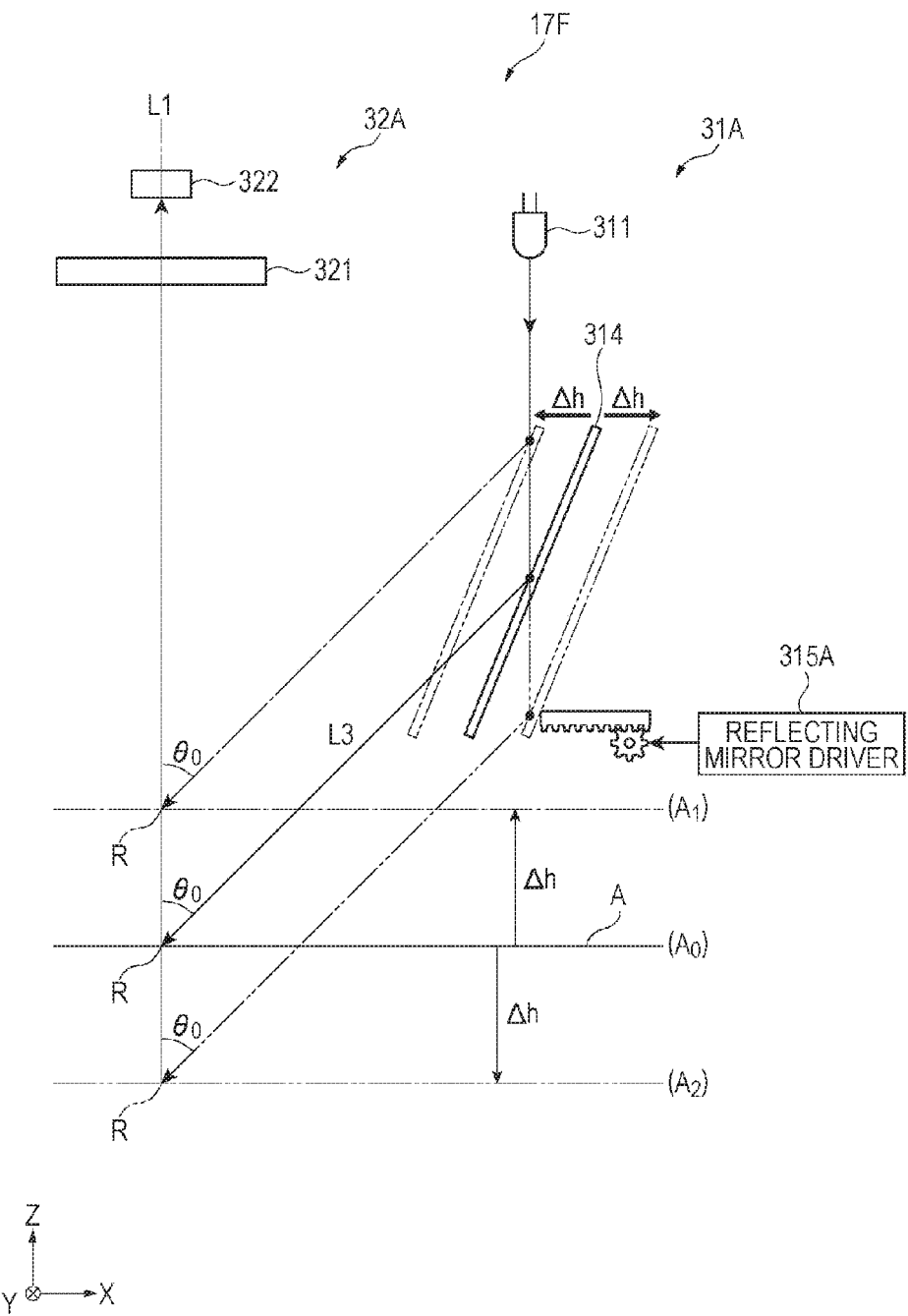
FIG. 13 is a schematic diagram illustrating a schematic configuration of a spectroscope and an optical path adjusting method of a seventh embodiment.

FIG. 13 is a schematic diagram illustrating an optical path adjusting method for a spectroscope 17F of the printer 10 according to the seventh embodiment. The apertures are not illustrated in FIG. 13.

The spectroscope 17F of the present embodiment includes the illumination optical system 31A and the light receiving optical system 32A as illustrated in FIG. 13. The light receiving optical system 32A has the same configuration as in the sixth embodiment and thus will not be described further.

The illumination-side reflecting mirror 314 of the illumination optical system 31A in the present embodiment includes, for example, a guide rail (not illustrated) along the X direction and is disposed to be parallelly movable along the guide rail.

A reflecting mirror driver 315A of the present embodiment includes a drive source such as a stepping motor and parallelly moves the illumination-side reflecting mirror 314 along the X direction with drive force from the drive source in the same manner as the reflecting mirror driver 326A of the second embodiment.

Furthermore, in the present embodiment, at least the dimension of the illumination-side second aperture 313 in the X direction is set to be larger by the allowable amount of change in the distance between the medium A and the spectroscope 17F as in the second embodiment.

The illumination-side second aperture 313 may be disposed between the illumination-side reflecting mirror 314 and the illumination-side first aperture 312. Furthermore, the illumination-side second aperture 313 may be moved simultaneously with the illumination-side reflecting mirror 314 by the distance difference Δh either in the −X direction or in the X direction.

In a spectrometry process performed by the printer 10 of the present embodiment, the optical path adjuster 154C performs the same process as in the second embodiment in Step S3 illustrated in FIG. 7.

That is, in the present embodiment, the optical path adjuster 154C calculates the distance difference Δh and parallelly moves the illumination-side reflecting mirror 314 in the X direction by the calculated distance difference Δh.

The optical path adjuster 154C moves the illumination-side reflecting mirror 314 in the +X direction (receding from the light receiving optical system 32A) if the distance detected by the distance sensor 18 is larger than the reference distance (distance between the medium A and the spectroscope 17F in the reference state $A_0$) and moves the illumination-side reflecting mirror 314 in a −X direction (approaching to the light receiving optical system 32A) if the detected distance is smaller than the distance in the reference state $A_0$.

Effect of Present Embodiment

In the present embodiment, the illumination-side reflecting mirror 314 is disposed to be parallelly movable in the Z direction, and the optical path adjuster 154C controls the reflecting mirror driver 315A to parallelly move the illumination-side reflecting mirror 314 along the X direction.

Accordingly, as in the sixth embodiment, the principal ray L3 of the illumination light can easily match the central measurement point R by a simple configuration. In addition, the illumination light can be incident at $\theta_0$ (in the range of 45°±2°) at the central measurement point R independently of the distance between the medium A and the spectroscope 17F. Therefore, a spectrometry process that complies with the color measurement standard can be appropriately performed.

Eighth Embodiment

Next, an eighth embodiment according to the invention will be described.

The attitude or position of the illumination-side reflecting mirror 314 of the illumination optical system 31A is changed in the sixth and seventh embodiments. Meanwhile, the eighth embodiment is different from the sixth and seventh embodiments in that the light source 311 in the illumination optical system 31A is moved.

Figure 14:
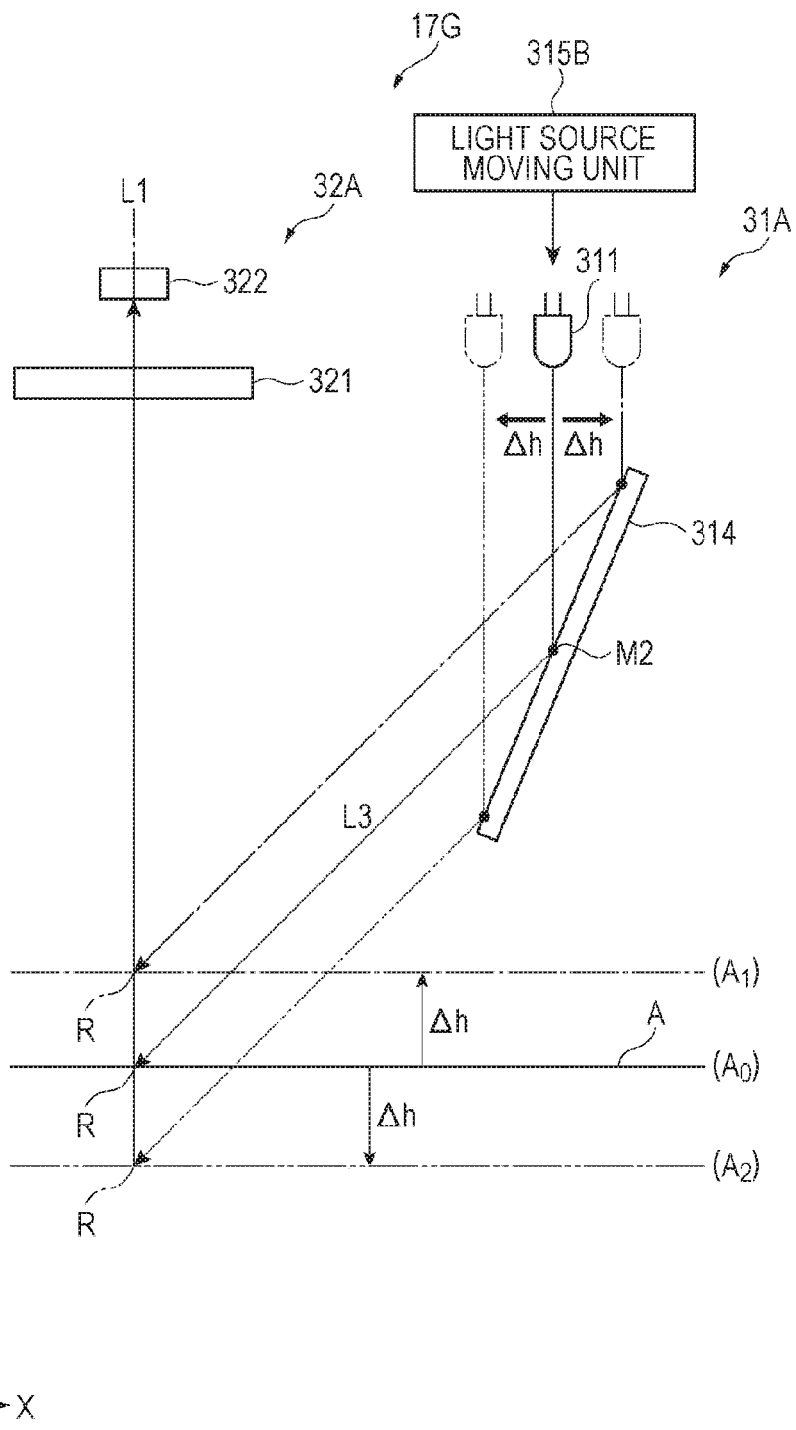
FIG. 14 is a schematic diagram illustrating a schematic configuration of a spectroscope and an optical path adjusting method of an eighth embodiment.

FIG. 14 is a schematic diagram illustrating an optical path adjusting method for a spectroscope 17G of the printer 10 according to the eighth embodiment. Each of the apertures is not illustrated in FIG. 14.

The spectroscope 17G of the present embodiment includes the illumination optical system 31A and the light receiving optical system 32A as illustrated in FIG. 14. The light receiving optical system 32A has the same configuration as in the sixth and seventh embodiments and thus will not be described further.

In the illumination optical system 31A of the present embodiment, the illumination-side reflecting mirror 314 is fixed, and the light source 311 is movable along the X direction.

The illumination optical system 31A includes a light source moving unit 315B that moves the light source 311 in the X direction. The light source moving unit 315B constitutes the second optical path adjusting unit of the invention with the optical path adjuster 154C.

A specific configuration of the light source moving unit 315B is similar to the light reception moving unit 326C in the third embodiment and is exemplified by, for example, a configuration including a stepping motor and a gear array that transmits drive force from the stepping motor, the configuration in which rotational drive force from the stepping motor is transmitted to, for example, a rack extending in the X direction that is disposed in a pedestal unit in which the light source 311 is installed.

In the present embodiment, at least the dimensions of the illumination-side first aperture 312 and the illumination-side second aperture 313 along the X direction are formed to be larger than the size of the light receiving region of the light receiver 322 by the allowable amount of change in the distance between the medium A and the spectroscope 17G.

The illumination-side first aperture 312 and the illumination-side second aperture 313 may be movable respectively in the X direction and in the Z direction. In this case, the light source moving unit 315B moves each of the apertures 312 and 313 in addition to the light source 311 by the distance difference Δh.

The illumination-side second aperture 313 may be disposed between the illumination-side reflecting mirror 314 and the illumination-side first aperture 312, and the apertures 312 and 313 may be moved along the X direction. In this case, the light source 311 and each of the apertures 312 and 313 may be integrally configured. Accordingly, the light source moving unit 315B can simultaneously move each of the apertures 312 and 313 in the X direction by the distance difference Δh by moving the light source 311 in the X direction.

In a spectrometry process performed by the printer 10 of the present embodiment, the optical path adjuster 154C performs approximately the same process as in the third embodiment in Step S3 illustrated in FIG. 7.

That is, in the present embodiment, the optical path adjuster 154C calculates the distance difference Δh and controls the light source moving unit 315B to parallelly move the light source 311 in the X direction by the calculated distance difference Δh.

The optical path adjuster 154C moves the light source 311 in the +X direction if the distance between the medium A and the spectroscope 17G is smaller than the reference distance and moves the light source 311 in the −X direction if the distance is larger than the reference distance.

Effect of Present Embodiment

In the present embodiment, the light source 311 is movable, and the optical path adjuster 154C controls the light source moving unit 315B to parallelly move the light source 311.

As such, as in the sixth and seventh embodiments, the range of measurement can be irradiated with the illumination light that has the same intensity and a uniform intensity distribution independently of the distance between the medium A and the spectroscope 17G by moving the light source 311. Accordingly, a high accuracy spectrometry process in which measurement error is reduced can be performed.

Furthermore, by parallelly moving the light source 311, the central measurement point R can be irradiated with the illumination light at $\theta_0$ (in the range of 45°±2°) independently of the distance between the medium A and the spectroscope 17G as in the seventh embodiment. Therefore, a spectrometry process that complies with the color measurement standard can be appropriately performed.

Ninth Embodiment

Next, a ninth embodiment according to the invention will be described.

While the eighth embodiment illustrates a configuration that parallelly moves the light source 311, the ninth embodiment is different from the eighth embodiment in that the light source 311 is pivoted.

Figure 15:
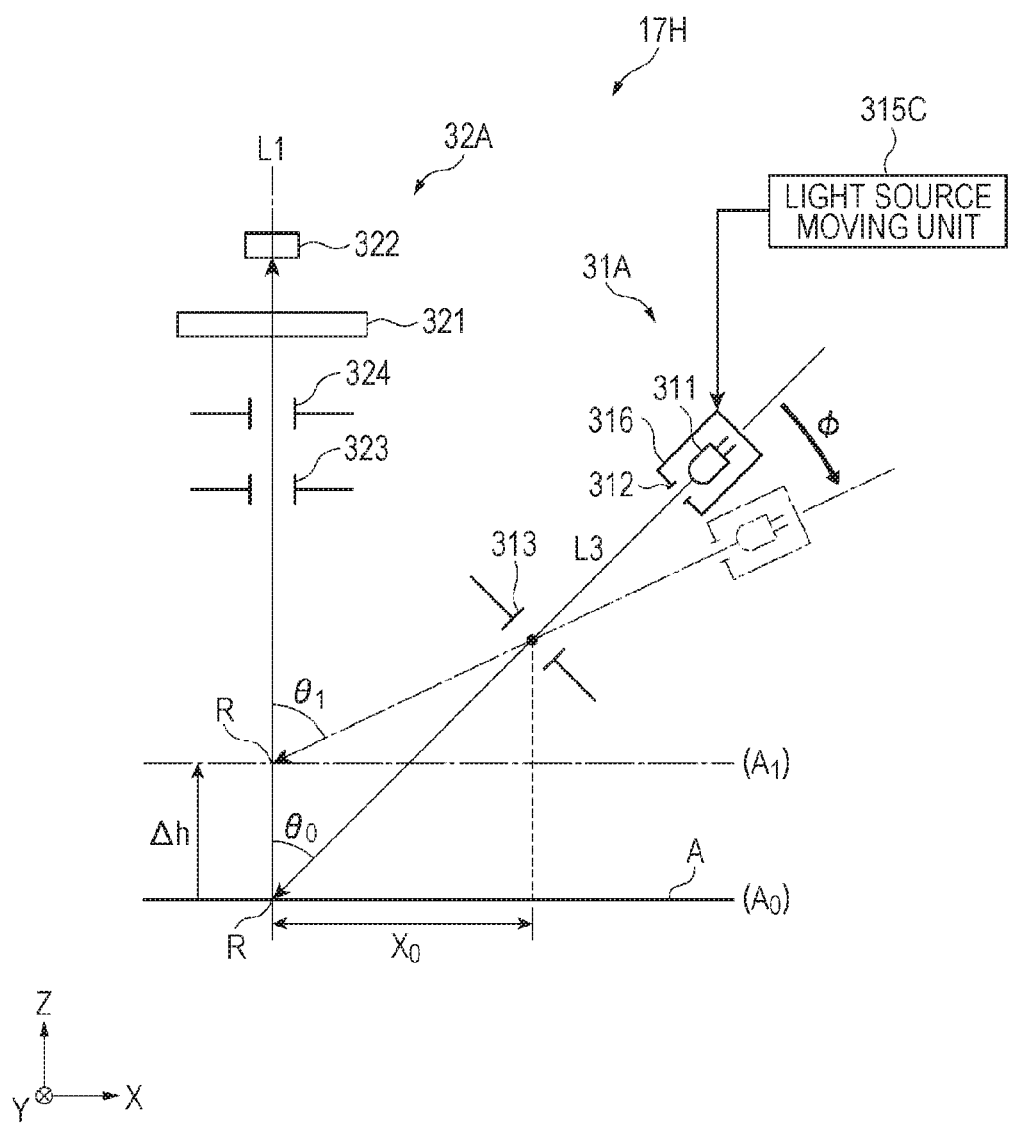
FIG. 15 is a schematic diagram illustrating a schematic configuration of a spectroscope and an optical path adjusting method of a ninth embodiment.

FIG. 15 is a diagram illustrating a schematic configuration of a spectroscope 17H of the ninth embodiment and an optical path adjusting method for the spectroscope 17H.

In the present embodiment, the medium A is irradiated with light emitted from the light source 311 that passes through the apertures 312 and 313 without being reflected by the illumination-side reflecting mirror 314 as illustrated in FIG. 15.

In addition, in the present embodiment, the position of the illumination-side second aperture 313 is fixed, and the light source 311 is disposed to be pivotable around an axis that passes through the center of the opening of the illumination-side second aperture 313 and is parallel to the Y direction. The illumination-side first aperture 312 may be formed to have a larger opening diameter or may be pivoted along with the light source 311.

As a specific configuration example, for example, if the illumination-side first aperture 312 is simultaneously pivoted, the light source 311 is accommodated in a light source unit 316 in which the illumination-side first aperture 312 is disposed, and the light source unit 316 is configured to be pivotable around the axis.

A light source moving unit 315C of the present embodiment pivots the light source unit 316 around the center of the opening of the illumination-side second aperture 313. A specific configuration example is exemplified by, for example, a configuration in which the light source unit 316 is fixed to a pivoting member of which the axis of rotation is set to the axis that passes through the center of the opening of the illumination-side second aperture 313 and in which rotational drive force from a stepping motor is transmitted to the pivoting member.

In a spectrometry process performed by the printer 10 of the present embodiment, the optical path adjuster 154C performs approximately the same process as in the fourth embodiment in Step S3 illustrated in FIG. 7.

That is, in the present embodiment, if a movement of the medium A from the reference state $A_0$ to the predetermined state $A_1$ changes the distance between the medium A and the spectroscope 17H by Δh, thereby requiring the angle of incidence of the illumination light with respect to the central measurement point R to be changed from $\theta_0$ to $\theta_1$, the light source unit 316 is rotated by the angle $\phi=\theta_0-\theta_1$.

Therefore, the optical path adjuster 154C of the present embodiment calculates the distance difference Δh on the basis of the distance detected in Step S2. In addition, given that $X_0$ is the distance from the central measurement point R to the center of the opening of the illumination-side second aperture 313 along the X direction, the angle of incidence $\theta_1 = \tan^{-1}\{X_0/(X_0+\Delta h)\}$ is calculated. Accordingly, the optical path adjuster 154C calculates the angle $\phi$ ($=\theta_0-\theta_1$) and controls the light source moving unit 315C to pivot the light source unit 316 by the calculated angle $\phi$. If the calculated angle $\phi$ is a negative value, the light source unit 316 is pivoted in the clockwise direction (direction approaching to the medium A) in the state illustrated in FIG. 15 (state where incident light advances in the −X direction). If the angle $\phi$ is a positive value, the light source unit 316 is pivoted in the counterclockwise direction (direction receding from the medium A).

Effect of Present Embodiment

In the present embodiment, the optical path adjuster 154C and the light source moving unit 315C pivot the light source 311 around the center of the opening of the illumination-side second aperture 313. In this case, as in the sixth to eighth embodiments, the range of measurement can be irradiated with the illumination light that has the same intensity and a uniform intensity distribution independently of the distance between the medium A and the spectroscope 17H, and high accuracy spectrometry can be performed.

Tenth Embodiment

Next, a tenth embodiment according to the invention will be described.

In the ninth embodiment, optical path adjustment in the illumination optical system is performed so that the principal ray of the illumination light matches the central measurement point R by pivoting the light source unit 316 in which the light source 311 is disposed around the illumination-side second aperture 313. Meanwhile, the tenth embodiment is different from the ninth embodiment in that the light source 311 is rotated.

Figure 16:
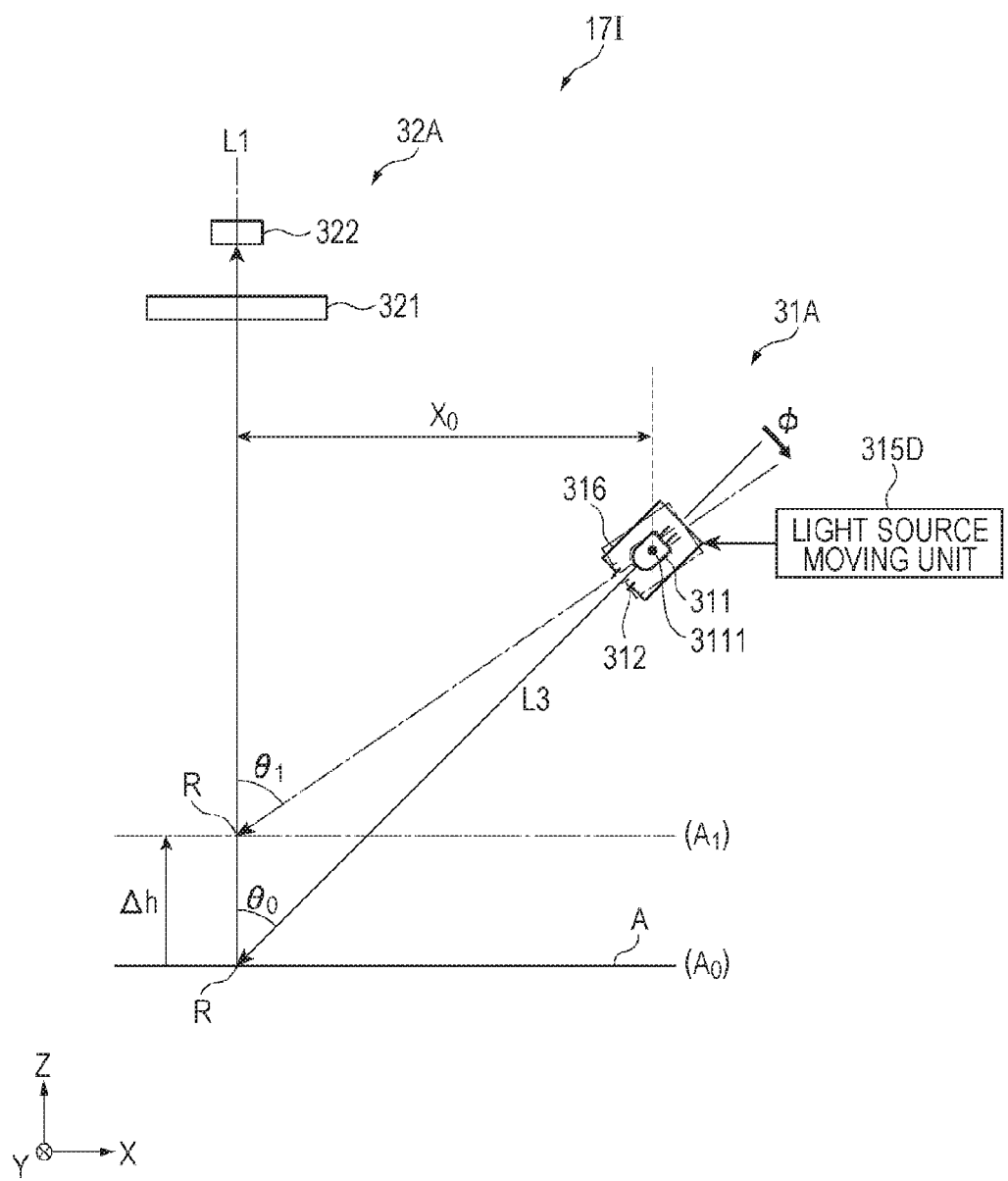
FIG. 16 is a schematic diagram illustrating a schematic configuration of a spectroscope and an optical path adjusting method of a tenth embodiment.

FIG. 16 is a diagram illustrating a schematic configuration of a spectroscope 17I of the tenth embodiment and an optical path adjusting method for the spectroscope 17I. The apertures 313, 323, and 324 are not illustrated in FIG. 16.

In the present embodiment, the light receiver 322 is rotatable around an axis that passes through the central point of the light receiving region and is parallel to the Y axis as illustrated in FIG. 16. The spectroscopy device 321 is disposed to be pivotable around the center of rotation of the light receiver 322.

In the present embodiment, the light-reception-side apertures 323 and 324 may be formed to have a larger opening diameter according to the allowable amount of change in the distance between the medium A and the spectroscope 17I or may be pivoted along with the spectroscopy device 321.

As a specific configuration, a rotating shaft 3111 that passes through a position corresponding to the light source 311 and is parallel to the Y direction is disposed in the light source unit 316 in which the light source 311 is accommodated. If the apertures 312 and 313 are simultaneously pivoted, the apertures 312 and 313 may also be incorporated into the light source unit 316.

A light source moving unit 315D of the present embodiment rotates the light source unit 316 around the rotating shaft 3111 of the light source 311. A specific configuration can be illustrated by the same configuration as the reflecting mirror driver 326 in the first embodiment and is exemplified by, for example, a configuration in which rotational drive force from a stepping motor is transmitted to the rotating shaft 3111.

In a spectrometry process performed by the printer 10 of the present embodiment, the optical path adjuster 154C, as in the ninth embodiment, calculates the angle $\phi=\theta_0-\theta_1$ and pivots the light source unit 316 by the calculated angle $\phi$ in Step S3 illustrated in FIG. 7. If the calculated angle $\phi$ is a negative value, the light source unit 316 is rotated in the clockwise direction in the state illustrated in FIG. 16 (state where incident light advances in the −X direction). If the angle $\phi$ is a positive value, the light source unit 316 is rotated in the counterclockwise direction.

Effect of Present Embodiment

In the present embodiment, the optical path adjuster 154C and the light source moving unit 315D rotate the light source 311. In this case, as in the sixth to ninth embodiments, the range of measurement can be irradiated with the illumination light that has the same intensity and a uniform intensity distribution independently of the distance between the medium A and the spectroscope 17I, and high accuracy spectrometry can be performed.

Eleventh Embodiment

Next, an eleventh embodiment according to the invention will be described.

In above each embodiment, reflective light that is reflected at the central measurement point R is received at the central point of the light receiving region of the light receiver 322 by adjusting the optical path of light emitted from the light source 311 in the illumination optical system 31A or the optical path of reflected light that is incident on the light receiving optical system 32. Meanwhile, the present embodiment is different from the above embodiments in that the entire carriage 13 is moved.

Figure 17:
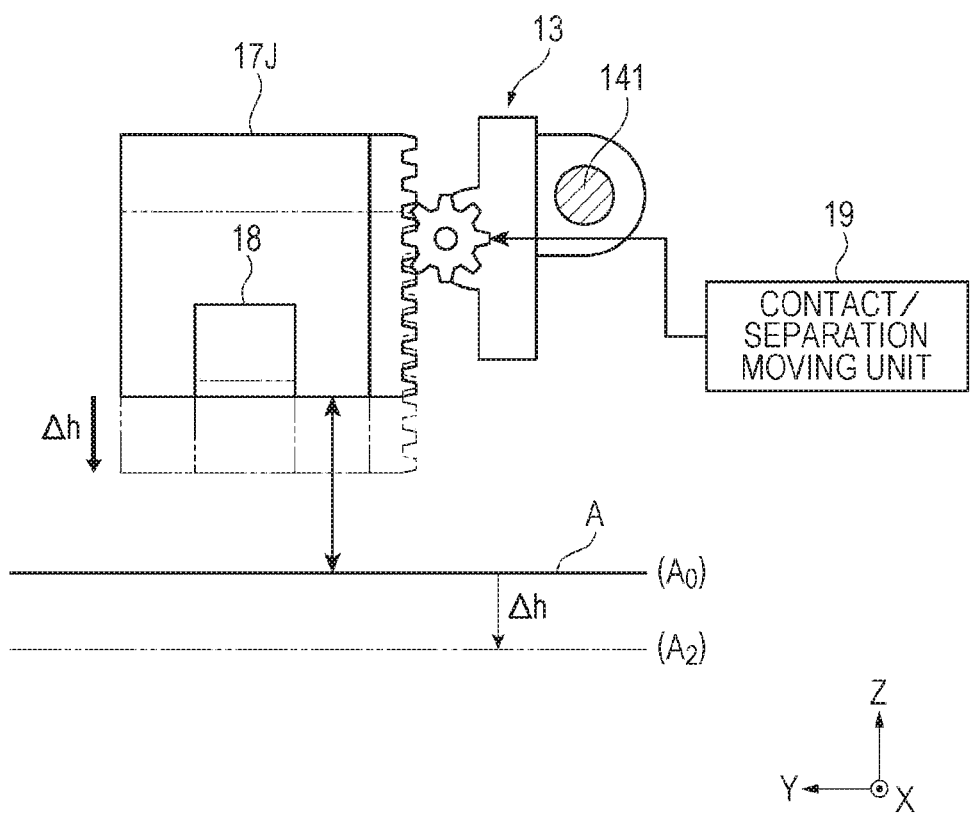
FIG. 17 is a diagram illustrating a schematic configuration of a carriage and an optical path adjusting method for a spectroscope of an eleventh embodiment.

FIG. 17 is a diagram illustrating a schematic configuration of the carriage 13 and an optical path adjusting method for a spectroscope 17J of the eleventh embodiment.

In the present embodiment, the spectroscope 17J and the distance sensor 18 are disposed to be movable in the Z direction with respect to the carriage 13 as illustrated in FIG. 17. The printing unit 16 may be integrally configured with the spectroscope 17J and may be movable in the Z direction.

An approach/separation moving unit 19 (moving unit in the invention) is disposed in the carriage 13 of the present embodiment. The approach/separation moving unit 19, for example, moves the spectroscope 17J and the distance sensor 18 along the Z direction with respect to the medium A by rotationally driving a pinion gear that engages with a rack disposed in the spectroscope 17J with drive force of a stepping motor or the like.

In a spectrometry process performed by the printer 10 of the present embodiment, the optical path adjuster 154C calculates the distance difference $\Delta h$ and controls the approach/separation moving unit 19 to move the approach/separation moving unit 19 by the distance difference $\Delta h$ in Step S3 illustrated in FIG. 7. That is, the optical path adjuster 154C maintains the distance between the medium A and the spectroscope 17J at a constant distance (reference distance corresponding to the reference state $A_0$).

In the present embodiment, the approach/separation moving unit 19 causes the spectroscope 17J to approach to or separate from the medium A on the basis of the distance detected by the distance sensor 18 so that the distance between the medium A and the spectroscope 17J is constant. Accordingly, as in above each embodiment, the range of measurement can be irradiated with the illumination light that has the same intensity and a uniform intensity distribution independently of the distance between the medium A and the spectroscope 17J, and reflected light from the range of measurement can be received in the light receiving region of the light receiver 322. Thus, high accuracy spectrometry can be performed.

Twelfth Embodiment

Next, a twelfth embodiment according to the invention will be described.

In the first to eleventh embodiments, reflective light that is reflected at the central measurement point R is received at the central point of the light receiving region of the light receiver 322 by adjusting the optical path of light emitted from the light source 311 in the illumination optical system 31A or the optical path of reflected light that is incident on the light receiving optical system 32. Meanwhile, the present embodiment is different from above each embodiment in that the light receiving region in the light receiver 322 is enlarged.

Figure 18A:
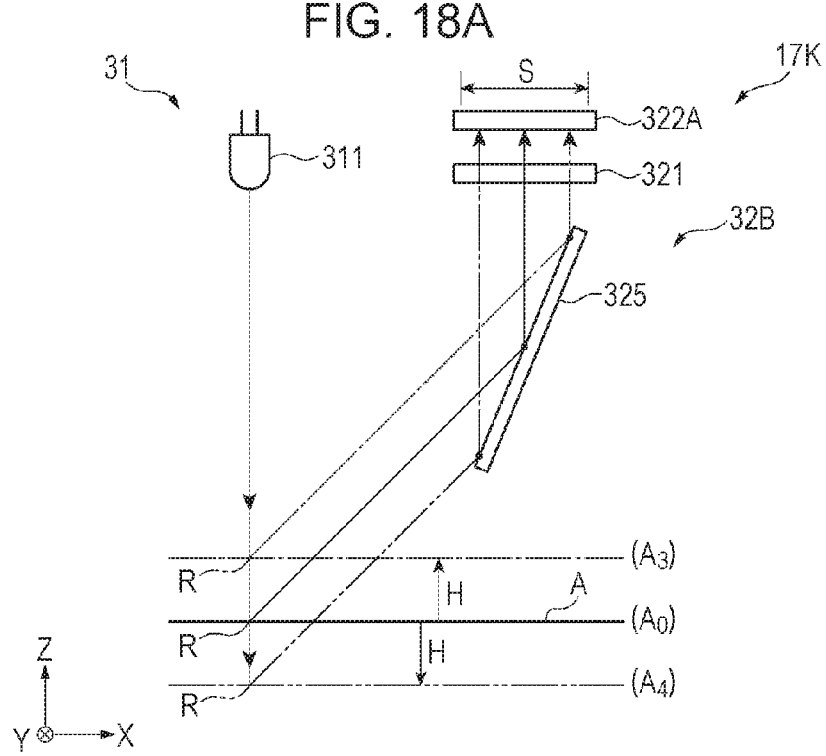
FIGS. 18A and 18B are schematic diagrams illustrating a schematic configuration of a spectroscope and an optical path adjusting method of a twelfth embodiment.
Figure 18B:
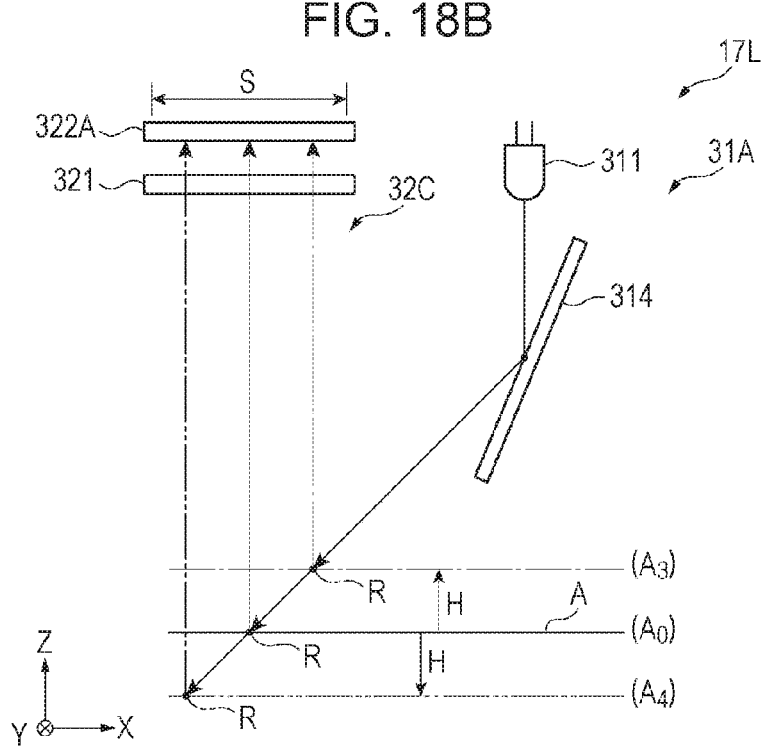

FIG. 18A is a schematic diagram illustrating an example of a spectroscope 17K of the present embodiment. FIG. 18B is a schematic diagram illustrating another example of a spectroscope 17L of the present embodiment.

The example illustrated in FIG. 18A is the spectroscope 17K that complies with (0°:45° x) in the color measurement standard, and FIG. 18B is the spectroscope 17L that is in accordance with (45° x:0°) in the color measurement standard.

The spectroscope 17K includes the illumination optical system 31, which is the same as in the first to fifth embodiments, and a light receiving optical system 32B. The light receiving optical system 32B includes the spectroscopy device 321, a light receiver 322A, a light-reception-side first aperture, and a light-reception-side second aperture. Each of these configurations is approximately the same as in the first to fifth embodiments and is fixed to a predetermined position.

The light receiver 322A of the present embodiment includes a light receiving region S that is formed to be larger than the light receiving region of the light receiver 322 in above each embodiment. Specifically, the size of the light receiving region S of the light receiver 322A is set to be larger than or equal to a size in which light from a predetermined range of measurement around the central measurement point R can be received by the light receiver 322A when the medium A is moved from the position corresponding to the reference state $A_0$ by the allowable amount of change (H) in the distance between the medium A and the spectroscope 17K (to a position $A_3$ or $A_4$). That is, given that the diametral dimension of the range of measurement is $\Phi$, a dimension dx of the light receiving region S of the light receiver 322A along the X direction satisfies $dx \geq \Phi + H \sin\theta_0$. A dimension dy of the light receiving region S of the light receiver 322A along the Y direction satisfies $dy \leq \Phi$.

The size of the reflecting films 54 and 55 of the wavelength-selective interference filter 5 of the spectroscopy device 321 is also set to be larger than or equal to the dimension of the light receiving region S of the light receiver 322A.

The spectroscope 17L includes the illumination optical system 31A, which is the same as in the sixth to tenth embodiments, and a light receiving optical system 32C. The light receiving optical system 32C includes the spectroscopy device 321, the light receiver 322A, a light-reception-side first aperture, and a light-reception-side second aperture. Each of these configurations is approximately the same as in the sixth to tenth embodiments and is fixed to a predetermined position.

The light receiver 322A in the spectroscope 17L, as in the spectroscope 17K, includes the light receiving region S of which the dimension dx along the X direction satisfies $dx \geq \Phi + H \sin\theta_0$ and of which the dimension dy along the Y direction satisfies $dy \leq IP$.

Effect of Present Embodiment

In the present embodiment, the light receiver 322A includes the light receiving region S of a size in which reflected light from the range of measurement in the medium A can be received when the distance between the medium A and the spectroscope 17K (17L) is the maximum allowable amount H. Therefore, even if the distance between the medium A and the spectroscope 17K (17L) is changed, a decrease in the intensity of light received in the light receiver 322 can be suppressed, and high accuracy spectrometry can be performed.

Other Embodiments

The invention is not limited to each embodiment described above. Modifications, improvements, and configurations obtained by an appropriate combination of each embodiment to the extent capable of achieving the advantage of the invention are to be included in the invention.

For example, the amount of optical path adjustment (for example, the angle of rotation $\phi$ of the reflecting mirror 325 or the distance difference $\Delta h$) with respect to the reference state $A_0$ is calculated in above each embodiment. However, if, for example, the distance detected by the distance sensor 18 is changed (for example, if the position of the medium is changed from the position $A_1$ to the position $A_2$) during spectrometry, optical path adjustment may be performed by the first optical path adjusting unit or the second optical path adjusting unit according to the changed distance.

While the reflecting mirror 325 is moved along the Z direction in the second embodiment, this is not for limitation purposes. For example, as the reflecting mirror 314 of the seventh embodiment, the reflecting mirror 325 may be moved in the X direction or may be moved in the direction that intersects with the X direction and the Z direction. Similarly, the reflecting mirror 314 of the seventh embodiment may be moved along the Z direction or may be moved in the direction that intersects with the X direction and the Z direction.

While the third to fifth embodiments illustrate a configuration in which the spectroscopy device 321 is moved or pivoted along with the movement or rotation of the light receiver 322, this is not for limitation purposes.

For example, in the third embodiment, the spectroscopy device 321 may not be moved provided that the size of the reflecting films 54 and 55 of the wavelength-selective interference filter 5 is sufficiently large and that light from the range of measurement can be incident on the reflecting films 54 and 55 even if the optical path of reflected light from the range of measurement is changed.

In the fourth and fifth embodiments, similarly, the spectroscopy device 321 may not be moved provided that the size of the reflecting films 54 and 55 is sufficiently large and that the voltage applied to the electrostatic actuator 56 is corrected for a desired transmitted wavelength on the basis of the angle of incidence of reflected light with respect to the reflecting films 54 and 55.

While the optical path in the light receiving optical system 32 or in the illumination optical system 31A is adjusted so that the optical path of light reflected at the central measurement point R (central point of the range of measurement) matches the normal line L1 at the center of the light receiver 322 in the first to tenth embodiments, this is not for limitation purposes. That is, in the invention, the point is that light that is reflected in the range of measurement having a predetermined size around the central measurement point R (for example, a circular shape of the diameter Φ) is received in the light receiving region of the light receiver 322. Therefore, the optical path of light reflected at the central measurement point R may be shifted from the normal line L1 at the central point of the light receiver 322 provided that, for example, as in the twelfth embodiment, the area of the light receiving region of the light receiver 322 is larger than the area of the range of measurement projected on the light receiver 322 (area of the projected region). The allowable amount of the shift can be appropriately set according to the size of the light receiving region in the light receiver 322, the size of the range of irradiation with the illumination light from the illumination optical system 31 (31A), the intensity distribution of the illumination light, the size of the projected region, and the like.

While the optical path of reflected light is adjusted by rotating the reflecting mirror 325 in the first embodiment or by parallelly moving the reflecting mirror 325 in the Z direction in the second embodiment, this is not for limitation purposes. For example, the reflecting mirror 325 may be rotated by a predetermined angle and moved in the Z direction (or in the X direction). In this case, given that the amount of movement in the Z direction is $\Delta z$ and that the angle of rotation of the reflecting mirror 325 is $\phi$, the amount of movement $\Delta z$ and the angle of rotation $\phi$ may be set so that $\tan(2\phi+\theta_0)=X_0/(X_0+\Delta h+\Delta z)$ is satisfied.

If optical path adjustment is performed by rotating only the reflecting mirror 325 as in the first embodiment, the difference between the angle of reflection of reflected light from the central measurement point R and the angle defined in the color measurement standard (in the range of 45°±2°) may be increased. The allowable range of a platen gap is determined by the accuracy of printing performed by the printing unit 16, and the first embodiment assumes that the angle of reflection does not fall outside the standard if the platen gap is in the allowable range. However, the angle of reflection may be deviated from the angular range set in the color measurement standard according to the distance between the medium and the spectroscope in a case where, for example, the invention is applied to other than a printer.

If the reflecting mirror 325 is moved as in the second embodiment, a space for moving the reflecting mirror 325 is required. As described above, a printer has an allowable range of the platen gap. Thus, it is not necessary to provide a space for moving the reflecting mirror 325 that exceeds the allowable range. However, the reflecting mirror 325 may be required to be significantly moved according to the distance between the medium and the spectroscope in a case where, for example, the invention is applied to other than a printer. In this case, it is necessary to secure a space for moving the reflecting mirror 325, and furthermore, the size of the reflecting mirror 325 is required to be increased in order to secure the range of reflection in which reflected light from the range of measurement is reflected.

Regarding this matter, if the angle of the reflecting mirror 325 is changed in addition to moving the reflecting mirror 325 as described above, changing the angle of the reflecting mirror can reduce the amount of movement of the reflecting mirror, and enabling movement of the reflecting mirror can control light from the central measurement point R so that the light is incident at the angle of reflection in the color measurement standard. Accordingly, problems as above can be resolved, and the spectrometry process can be performed on a wide range of measurement targets. That is, the spectrometry device of the invention can be easily applied to various electronic apparatuses.

While modification examples of the light receiving optical system in the first and second embodiments are described above, the same applies to a case where the illumination-side reflecting mirror 314 of the illumination optical system 31A in the sixth and seventh embodiments is used. Attitude change and parallel movement of the illumination-side reflecting mirror 314 may be performed simultaneously.

While the reflecting mirror 325 is rotated around the position of reflection M1 in the first embodiment, this is not for limitation purposes. For example, the drive shaft 3251 may be disposed in one end portion of the reflecting mirror 325. In this case, as described above, the reflecting mirror 325 is rotated so that the position of reflection M1 of the reflecting mirror 325 does not move, and in addition, the reflecting mirror 325 is parallelly moved in a predetermined direction as in the second embodiment. If, as in the twelfth embodiment, the light receiving region of the light receiver 322 is sufficiently large and has a size that is larger than or equal to the amount of change in the position of reflection M1 accompanied by rotation of the reflecting mirror 325, the reflecting mirror 325 may not be parallelly moved.

Furthermore, rotation, pivoting, parallel movement, and the like of the light receiver 322 and the spectroscopy device 321 may be combined in addition to the attitude change and parallel movement of the reflecting mirror 325 as above. Similarly, rotation, pivoting, parallel movement, and the like of the light source 311 may be combined in addition to attitude change and parallel movement of the illumination-side reflecting mirror 314.

While above each embodiment illustrates a configuration in which the unit controller circuit 152 is disposed in the control unit 15, a control unit may be disposed in each unit separately from the control unit 15 as above. For example, a filter controller circuit that controls the wavelength-selective interference filter 5 and a light reception controller circuit that controls the light receiver 322 may be disposed in the spectroscope 17. In addition, a microcomputer and a memory that stores the V-λ data may be incorporated into the spectroscope 17, and the microcomputer may function as the optical path adjuster 154C and the measuring controller 154D.

While above each embodiment illustrates the printing unit 16 as an ink jet type that discharges ink supplied from the ink tank by driving the piezoelectric element, this is not for limitation purposes. For example, the printing unit 16 may discharge ink by generating an air bubble with a heater in the ink or may discharge ink with an ultrasonic vibrator.

This is not limited to an ink jet type and, for example, can be applied to a printer of any printing type such as a thermal printer using thermal transfer, a laser printer, and a dot impact printer.

While above each embodiment illustrates the wavelength-selective interference filter 5 as a light transmitting type that transmits light of a wavelength corresponding to the gap G between the reflecting films 54 and 55 from incident light, this is not for limitation purposes. For example, a light reflecting wavelength-selective interference filter that reflects light of a wavelength corresponding to the gap G between the reflecting films 54 and 55 may be used.

While above each embodiment illustrates the spectroscopy device 321 in which the wavelength-selective interference filter 5 is accommodated in the casing 6, for example, the wavelength-selective interference filter 5 may be directly disposed in the spectroscope 17.

While the wavelength-selective interference filter 5 is illustrated as a spectroscopy element, this is not for limitation purposes. For example, a grating, an AOTF, or an LCTF may be used as a spectroscopy element.

While above each embodiment illustrates a configuration (post-dispersive spectroscopy) in which the spectroscopy device 321 including the wavelength-selective interference filter 5 is disposed in the light receiving optical system 32 (32A, 32B, and 32C), this is not for limitation purposes.

For example, the wavelength-selective interference filter 5 or the spectroscopy device 321 including the wavelength-selective interference filter 5 may be arranged in the illumination optical system 31, and the medium A may be irradiated with light on which spectroscopy is performed with the wavelength-selective interference filter 5 (pre-dispersive spectroscopy). If the pre-dispersive spectroscopy configuration is applied in the sixth to tenth embodiments, it is preferable to parallelly move or pivot the spectroscopy device 321 along with the light source 311.

While above each embodiment illustrates the printer that includes the spectrometry device, this is not for limitation purposes. For example, the spectrometry device may not include an image forming unit and perform only the colorimetry process on the medium A. The spectrometry device of the invention may be incorporated into, for example, a quality inspecting apparatus that inspects the quality of a printed matter manufactured in a factory or the like, or besides, the spectrometry device of the invention may be incorporated into any apparatus.

Besides, a specific structure in embodying the invention may be configured by appropriately combining above each embodiment and the modification examples to the extent capable of achieving the advantage of the invention and may be appropriately changed to other structures and the like.

The entire disclosure of Japanese Patent Application No. 2015-049939 filed on Mar. 12, 2015 is expressly incorporated by reference herein.

What is claimed is:

1. A spectrometry device comprising:
a spectroscope that includes a light receiving optical system including a light receiver and on which light from a measurement target is incident;
a distance detector that detects a distance between the measurement target and the spectroscope; and
a first optical path adjusting unit that adjusts an optical path of the light incident on the light receiving optical system from the measurement target according to the distance detected by the distance detector,
wherein the light receiving optical system includes a first reflecting mirror that reflects the light incident on the light receiving optical system toward the light receiver, and
the first optical path adjusting unit adjusts the optical path by changing an angle between a surface of the first reflecting mirror and a direction from the first reflecting mirror toward the light receiver such that the angle becomes smaller as the distance increases.

2. The spectrometry device according to claim 1,
wherein the spectroscope includes an illumination optical system that irradiates the measurement target with illumination light, and
the first optical path adjusting unit adjusts the optical path of the light incident on the light receiving optical system so that the light that is reflected toward the light receiving optical system from a region in the measurement target irradiated with the illumination light is incident on the light receiver.

3. The spectrometry device according to claim 1,
wherein the light receiving optical system includes a first reflecting mirror that reflects the light incident on the light receiving optical system toward the light receiver, and
the first optical path adjusting unit moves the first reflecting mirror in a predetermined direction.

4. The spectrometry device according to claim 1,
wherein the first optical path adjusting unit moves the light receiver.

5. The spectrometry device according to claim 4,
wherein the first optical path adjusting unit parallelly moves the light receiver.

6. The spectrometry device according to claim 4,
wherein the light receiving optical system includes an aperture that passes part of light from the measurement target, and
the first optical path adjusting unit pivots the light receiver around the aperture.

7. The spectrometry device according to claim 4,
wherein the light receiving optical system includes a spectroscopy element on which the light incident on the light receiving optical system is incident, and
the first optical path adjusting unit moves the spectroscopy element.

8. The spectrometry device according to claim 1,
wherein the first optical path adjusting unit rotates the light receiver.

9. The spectrometry device according to claim 8,
wherein the light receiving optical system includes a spectroscopy element on which the light from the measurement target is incident, and
the first optical path adjusting unit pivots the spectroscopy element.

10. An image forming apparatus comprising:
the spectrometry device according to claim 1; and
an image forming unit that forms an image on an image formation target.

11. A spectrometry device comprising:
a spectroscope that includes an illumination optical system including a light source and irradiating a measurement target with illumination light and a light receiving optical system including a light receiver and on which light reflected by the measurement target is incident;
a distance detector that detects a distance between the measurement target and the spectroscope; and
a second optical path adjusting unit that adjusts an optical path of the illumination light emitted from the light source according to the distance detected by the distance detector,
wherein the illumination optical system includes a second reflecting mirror that reflects the illumination light from the light source toward the measurement target, and
the second optical path adjusting unit adjusts the optical path by changing an angle between a surface of the second reflecting mirror and a direction from light source toward the second reflecting mirror such that the angle becomes smaller as the distance increases.

12. The spectrometry device according to claim 11,
wherein the second optical path adjusting unit adjusts the optical path of the light emitted from the light source so that light that is reflected toward the light receiving optical system from a region in the measurement target irradiated with the illumination light is incident on the light receiver.

13. The spectrometry device according to claim 11, wherein the illumination optical system includes a second reflecting mirror that reflects the light from the light source toward the measurement target, and
the second optical path adjusting unit moves the second reflecting mirror.

14. The spectrometry device according to claim 11, wherein the second optical path adjusting unit moves the light source.

15. The spectrometry device according to claim 14, wherein the second optical path adjusting unit parallelly moves the light source.

16. The spectrometry device according to claim 14, wherein the illumination optical system includes an illumination-side aperture that passes part of the light emitted from the light source, and
the second optical path adjusting unit pivots the light source around the illumination-side aperture.

17. The spectrometry device according to claim 11, wherein the second optical path adjusting unit rotates the light source.

18. A spectrometry device comprising:
a spectroscope that includes an illumination optical system including a light source and irradiating a measurement target with illumination light and a light receiving optical system including a light receiver and on which light reflected by the measurement target is incident,
wherein the light receiver includes a light receiving region of a size in which the light reflected from a predetermined range of measurement in the measurement target is received when a distance between the measurement target and the spectroscope is in a predetermined allowable distance,
wherein the light receiving optical system includes a first reflecting mirror that reflects the light incident on the light receiving optical system toward the light receiver, and
an optical path of the light incident on the light receiving optical system from the measurement target is adjusted by changing an angle between a surface of the first reflecting mirror and a direction from the first reflecting mirror toward the ht receiver such that the angle becomes smaller as the distance increases.

* * * * *